United States Patent
Kurahashi

(10) Patent No.: US 9,369,693 B2
(45) Date of Patent: Jun. 14, 2016

(54) STEREOSCOPIC IMAGING DEVICE AND SHADING CORRECTION METHOD

(71) Applicant: FUJIFILM CORPORATION, Tokyo (JP)

(72) Inventor: Hidekazu Kurahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 396 days.

(21) Appl. No.: 13/772,728

(22) Filed: Feb. 21, 2013

(65) Prior Publication Data

US 2013/0162780 A1  Jun. 27, 2013

Related U.S. Application Data

(63) Continuation of application No. PCT/JP2011/071142, filed on Sep. 15, 2011.

(30) Foreign Application Priority Data

Sep. 22, 2010  (JP) ................................. 2010-212460
Jan. 17, 2011  (JP) ................................. 2011-006997

(51) Int. Cl.
  *H04N 13/02* (2006.01)
  *H04N 5/357* (2011.01)
  (Continued)

(52) U.S. Cl.
  CPC ............. *H04N 13/02* (2013.01); *H04N 5/3572* (2013.01); *H04N 13/0018* (2013.01); *H04N 13/0217* (2013.01); *H04N 5/23245* (2013.01); *H04N 13/0257* (2013.01); *H04N 13/0285* (2013.01)

(58) Field of Classification Search
  CPC .............. H04N 13/0018; H04N 13/02; H04N 13/0217; H04N 13/0257; H04N 13/0285; H04N 5/23245; H04N 5/3572; H04N 13/0239; H04N 13/0055; H04N 13/0296; H04N 13/0497; H04N 13/0242
  USPC .......................................................... 348/46
  See application file for complete search history.

(56) References Cited

U.S. PATENT DOCUMENTS 4,381,521 A * 4/1983 Iida .......................... H04N 9/07
                                                          348/273
5,181,104 A * 1/1993 Sugishima ............. H04N 1/047
                                                          358/453

(Continued)

FOREIGN PATENT DOCUMENTS

JP  2000-20691 A  1/2000
JP  2007-279512 A  10/2007

(Continued)

OTHER PUBLICATIONS

Adelson et al, Single Lens Stereo with a Plenoptic Camera, 1992.*

(Continued)

*Primary Examiner* — Shan Elahi
(74) *Attorney, Agent, or Firm* — Birch, Stewart, Kolasch & Birch, LLP

(57) ABSTRACT

Provided is a technique for improving the quality of an image obtained by a pupil-division-type stereoscopic imaging device. First and second images obtained by the stereoscopic imaging device according to the present invention have the shading of an object in a pupil division direction. Therefore, when the first and second images are composed, reference data in which shading is cancelled is generated. The amount of shading correction for the first and second images is determined on the basis of the reference data and shading correction is performed on the first and second images on the basis of the determined amount of shading correction.

8 Claims, 23 Drawing Sheets

(51) Int. Cl.
*H04N 13/00* (2006.01)
*H04N 5/232* (2006.01)

(56) References Cited

U.S. PATENT DOCUMENTS

| | | | | |
|---|---|---|---|---|
| 5,539,487 | A * | 7/1996 | Taguchi | G02B 3/005 348/E13.008 |
| 5,684,890 | A * | 11/1997 | Miyashita | G06T 7/004 382/154 |
| 5,697,006 | A * | 12/1997 | Taguchi | G02B 3/005 348/48 |
| 6,018,416 | A * | 1/2000 | Mihara | G02B 17/02 359/423 |
| 6,278,480 | B1 * | 8/2001 | Kurahashi | G02B 27/2214 348/59 |
| 6,314,242 | B1 * | 11/2001 | Mihara | G02B 23/14 396/150 |
| 7,307,763 | B2 * | 12/2007 | Yamamoto | G03D 3/00 358/1.9 |
| 7,672,536 | B2 * | 3/2010 | Kondo | G06K 9/4609 345/426 |
| 8,077,305 | B2 * | 12/2011 | Owen | G01N 21/8806 356/237.1 |
| 8,233,748 | B2 * | 7/2012 | Lee | G06T 3/4007 345/660 |
| 8,436,893 | B2 * | 5/2013 | McNamer | H04N 13/021 345/419 |
| 8,508,580 | B2 * | 8/2013 | McNamer | H04N 13/0221 348/43 |
| 8,922,628 | B2 * | 12/2014 | Bond | H04N 13/0495 345/419 |
| 2002/0015514 | A1 * | 2/2002 | Kinjo | G06K 9/00221 382/118 |
| 2002/0028014 | A1 * | 3/2002 | Ono | H04N 13/021 382/154 |
| 2002/0154215 | A1 * | 10/2002 | Schechterman | A61B 1/00193 348/51 |
| 2005/0008246 | A1 * | 1/2005 | Kinjo | G06K 9/00308 382/254 |
| 2005/0264858 | A1 * | 12/2005 | Vesely | G02B 27/2221 359/13 |
| 2006/0028684 | A1 * | 2/2006 | Namizuka | G06T 3/40 358/1.16 |
| 2006/0039593 | A1 * | 2/2006 | Sammak | G06K 9/00127 382/133 |
| 2006/0233427 | A1 * | 10/2006 | Hauke | G06K 9/00033 382/124 |
| 2006/0251299 | A1 * | 11/2006 | Kinjo | G06K 9/00308 382/118 |
| 2007/0036462 | A1 * | 2/2007 | Crandall | G02B 21/002 382/284 |
| 2007/0115286 | A1 * | 5/2007 | Kondo | G06K 9/4609 345/426 |
| 2007/0139520 | A1 * | 6/2007 | Loce | H04N 13/0402 348/60 |
| 2007/0285554 | A1 * | 12/2007 | Givon | G03H 1/268 348/340 |
| 2008/0002910 | A1 * | 1/2008 | Ojima | G06T 15/00 382/277 |
| 2008/0055400 | A1 * | 3/2008 | Schechterman | A61B 1/00193 348/51 |
| 2008/0165261 | A1 | 7/2008 | Kamo | |
| 2009/0022402 | A1 * | 1/2009 | Lee | G06T 3/4007 382/195 |
| 2009/0073558 | A1 * | 3/2009 | Jacobs | G02B 27/017 359/464 |
| 2009/0116732 | A1 * | 5/2009 | Zhou | H04N 13/0029 382/154 |
| 2009/0160931 | A1 * | 6/2009 | Pockett | H04N 13/0018 348/42 |
| 2009/0322857 | A1 * | 12/2009 | Jacobs | G02B 27/017 348/42 |
| 2010/0194862 | A1 * | 8/2010 | Givon | G03H 1/268 348/49 |
| 2010/0302355 | A1 * | 12/2010 | Tamaru | G06T 7/0022 348/59 |
| 2011/0025825 | A1 * | 2/2011 | McNamer | H04N 13/0221 348/46 |
| 2011/0025829 | A1 * | 2/2011 | McNamer | H04N 13/021 348/50 |
| 2011/0025830 | A1 * | 2/2011 | McNamer | H04N 13/021 348/50 |
| 2011/0109620 | A1 * | 5/2011 | Hong | G06T 11/001 345/419 |
| 2012/0002014 | A1 * | 1/2012 | Walsh | G06T 19/006 348/47 |
| 2012/0057000 | A1 | 3/2012 | Rohaly et al. | |

FOREIGN PATENT DOCUMENTS

| | | |
|---|---|---|
| JP | 2008-172321 A | 7/2008 |
| JP | 2009-165115 A | 7/2009 |
| JP | 2009-527007 A | 7/2009 |
| JP | 2010-145544 A | 7/2010 |

OTHER PUBLICATIONS

International Search Report, mailed Dec. 20, 2011, issued in PCT/JP2011/071142.

Written Opinion of the International Searching Authority, mailed Dec. 20, 2011, issued in PCT/JP2011/071142.

* cited by examiner

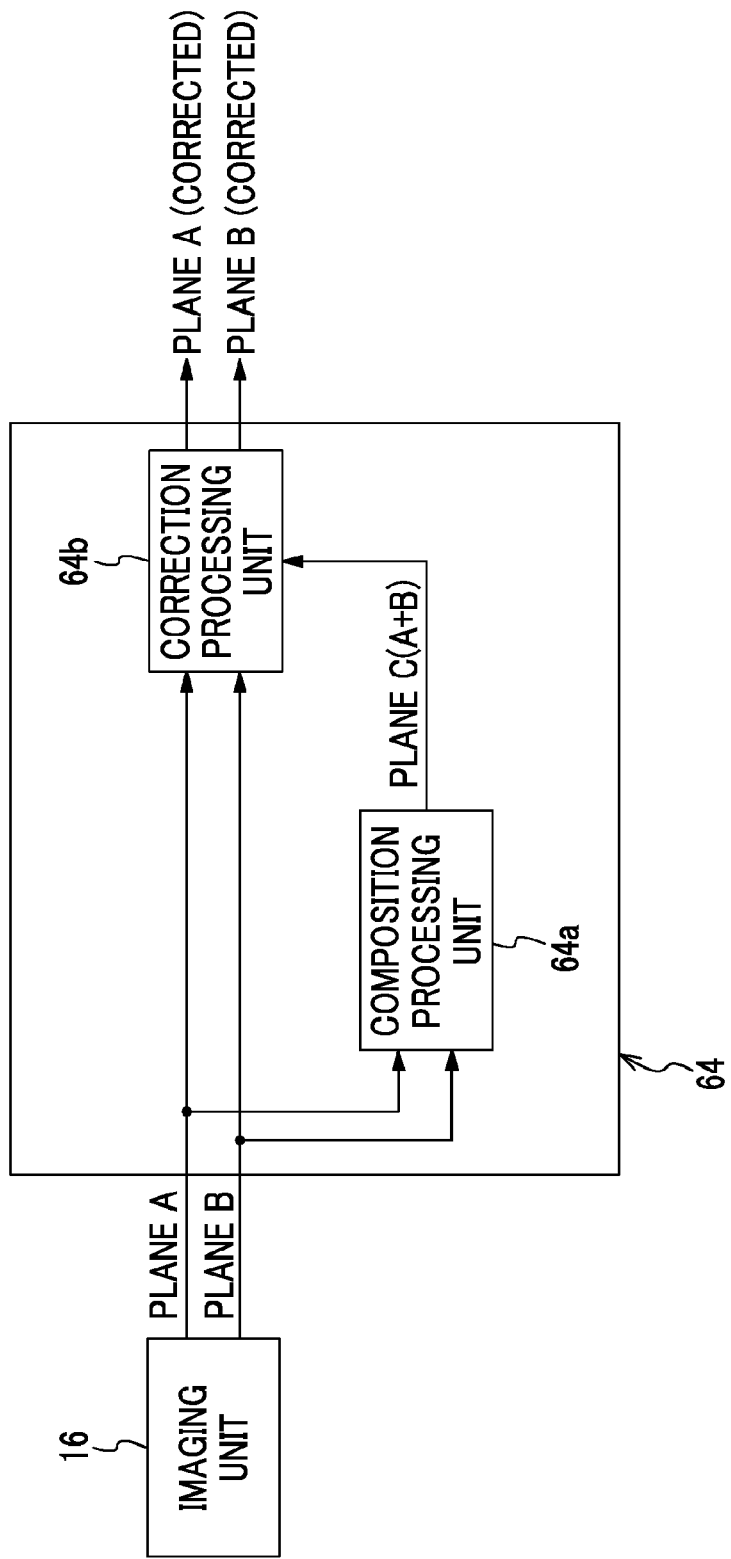

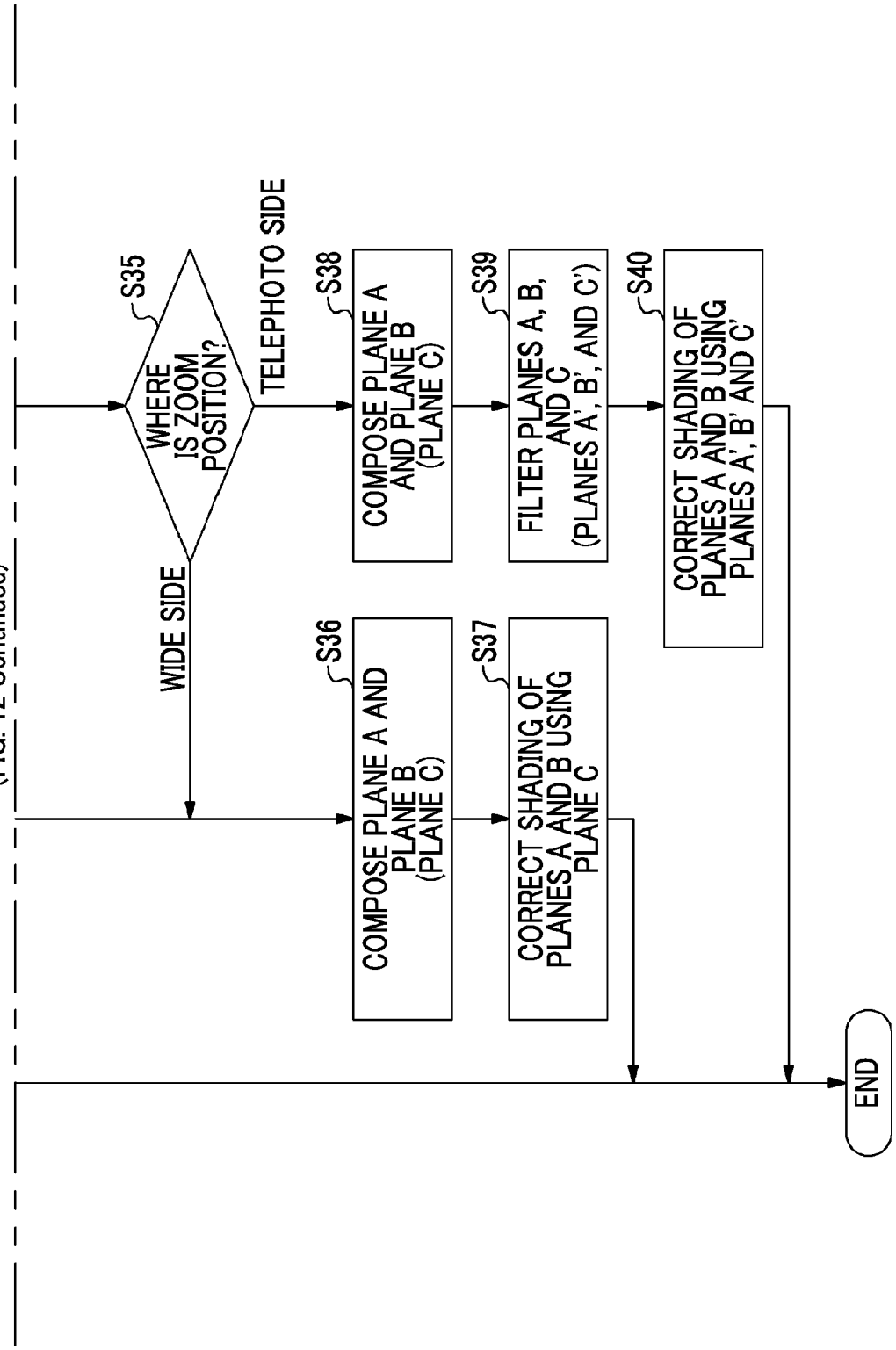

STEREOSCOPIC IMAGING DEVICE AND SHADING CORRECTION METHOD

This application is the a Continuation of PCT/JP2011/071142 filed on Sep. 15, 2011, which claims priority under U.S.C. 119(a) to Patent Application Nos. 2010-212460 filed in Japan on Sep. 22, 2010 and 2011-006997 filed in Japan on Jan. 17, 2011, all of which are hereby expressly incorporated by reference into the present application.

BACKGROUND OF THE INVENTION

1. Field of the Invention

The present invention relates to an imaging device, and more particularly, to a technique for forming an object image which passes through different regions of an imaging lens in two directions on an imaging element to acquire different viewpoint images.

2. Description of the Related Art

JP2010-145544A, JP2007-279512A, and JP2009-527007T are examples of a pupil-division-type stereoscopic imaging device according to the related art.

JP2010-145544A discloses a stereoscopic imaging device that performs shading correction on an image A and an image B which are obtained from different exit pupil regions to calculate the amount of phase difference. The shading correction is performed by dividing the image B by the image A or multiplying the image A and the image B.

JP2007-279512A discloses a stereoscopic imaging device that shifts a microlens provided on a photodiode to perform stereoscopic imaging. When the stereoscopic imaging is performed, the shift direction of the microlens and the amount of shift of the microlens are changed by the center and periphery of a light receiving surface of a base to reduce the influence of shading on image quality.

For example, JP2009-527007T discloses a single-eye stereoscopic imaging device including an optical system shown in FIG. 13.

In the optical system shown in FIG. 13, an object image which passes through different regions of a main lens 1 and a relay lens 2 in the lateral direction is pupil-divided by a mirror 4 and the divided images are formed on imaging elements 7 and 8 through imaging lenses 5 and 6, respectively.

FIGS. 14A to 14C are diagrams illustrating the separated state of an image formed on imaging elements due to the difference among the front focus, the best focus, and the rear focus. In FIGS. 14A to 14C, the mirror 4 shown in FIG. 13 is not shown in order to compare the difference in separation according to the focus.

As shown in FIG. 14B, among the pupil-divided images, the best focus images are formed (superimposed) at the same position on the imaging element. However, as shown in FIGS. 14A and 14C, the front focus images and the rear focus images are formed (separated) at different positions on the imaging element.

Therefore, when the object images which are pupil-divided in the lateral direction are acquired through the imaging elements 7 and 8, a left viewpoint image and a right viewpoint image with viewpoints which vary depending on the object distance are obtained. A 3D image can be generated from the obtained left viewpoint image and right viewpoint image.

It has been known that, when the image of an object is formed on the imaging surface of the imaging element by an optical system, such as a zoom lens, the image captured by the imaging element is blurred by the influence of the aberration of the optical system, as compared to the original object. The intensity distribution g of the image obtained at that time is calculated by adding noise n to the convolution of the brightness distribution f of the original object and a point spread function h indicating the imaging performance of the optical system, as follows:

$$g = f * h + n \quad (* \text{ is convolution}).\qquad\text{[Expression A]}$$

Since g, h, and n have been known, the brightness distribution f of the original object can be calculated from Expression A. In this way, a technique for removing the burring of the optical system using signal processing to obtain an ideal image is called the "restoration" of the image or "deconvolution". A restoration filter based on the point spread function (PSF) is generated considering information about the deterioration of the image during imaging, for example, imaging conditions (for example, an exposure time, the amount of exposure, the distance to the object, and a focal length) or characteristics information about an imaging device (for example, the optical characteristics of a lens and imaging device identification information) (JP2008-172321A).

A deterioration model due to blurring can be represented by a function. For example, a blurring phenomenon can be represented by a normal distribution having the distance (image height) from a central pixel as a parameter (JP2000-020691A).

JP2009-165115A discloses an example of an imaging device in which 3×3 (=9) pixels on an imaging element are allocated to one microlens.

SUMMARY OF THE INVENTION

However, shading which causes a distortion in light and darkness occurs in each viewpoint image due to the unique pixel arrangement of the pupil-division-type stereoscopic imaging device, and a brightness difference between the viewpoint images occurs. As a result, image quality deteriorates. In addition, when a full-pixel planar image is recorded, brightness is not only reduced, but a reduction in image quality, such as a reduction in resolution or spurious resolution, occurs. Since the intensity of shading is also changed by the aperture of the lens, it is necessary to perform correction according to imaging conditions.

In JP2010-145544A, level correction is performed which filters the image A and the image B using a low-pass filter to reduce random noise. However, the result of the level correction changes with a change in the imaging conditions. In JP2007-279512, since the amount of shift of the microlens is adjusted at the center of the imaging element and in the periphery thereof, the amount of phase difference varies depending on the position of the pixels. Therefore, it is necessary to perform correction corresponding to the change in the phase difference.

The present invention has been made in view of the above-mentioned problems and an object of the present invention is to provide a technique for improving the quality of an image obtained by a pupil-division-type stereoscopic imaging device.

In order to achieve the object, according to an aspect of the present invention, there is provided a stereoscopic imaging device that outputs a plurality of images with a phase difference caused by pupil division for a beam emitted from a single imaging optical system and can restore a stereoscopic image with a parallax corresponding to the phase difference from the plurality of images. The stereoscopic imaging device includes: a composition unit that composes the plurality of images and outputs reference data for shading correction on the basis of the composite image of the plurality of images; and a correction unit that compares the reference data output from the composition unit with each of the plurality of images to determine the amount of shading correction for each of the plurality of images and corrects the shading of each of the plurality of images on the basis of the determined amount of shading correction.

The stereoscopic imaging device according to the above-mentioned aspect of the present invention may further include a thinning unit that thins out pixels of each of the plurality of images. The composition unit may compose the plurality of images from which the pixels are thinned out by the thinning unit and output the reference data for shading correction on the basis of the composite image of the plurality of images. The correction unit may interpolate the reference data such that the size thereof is equal to the original size of each of the plurality of images, compare the interpolated reference data with each of the plurality of images to determine the amount of shading correction for each of the plurality of images, and correct the shading of each of the plurality of images on the basis of the determined amount of shading correction.

The stereoscopic imaging device according to the above-mentioned aspect of the present invention may further include a filtering unit that filters the reference data and each of the plurality of images using a low-pass filter and outputs the filtered reference data and the filtered plurality of images. The correction unit may compare the reference data and each of the plurality of images output from the filtering unit to determine the amount of shading correction for each of the plurality of images, and correct the shading of each of the plurality of images on the basis of the determined amount of shading correction.

The stereoscopic imaging device according to the above-mentioned aspect of the present invention may further include: an acquisition unit that acquires set information when each of the plurality of images is captured; and a determination unit that determines whether the shading correction by the correction unit is needed on the basis of the set information acquired by the acquisition unit. The correction unit may correct the shading of each of the plurality of images when the determination unit determines that the shading correction by the correction unit is needed.

In the stereoscopic imaging device according to the above-mentioned aspect of the present invention, the set information may include imaging mode setting information indicating a stereoscopic image capture mode or a planar image capture mode. When the imaging mode setting information indicates the planar image capture mode, the determination unit may determine that the shading correction by the correction unit is needed.

In the stereoscopic imaging device according to the above-mentioned aspect of the present invention, when the imaging mode setting information indicates the stereoscopic image capture mode, the determination unit may determine that the shading correction by the correction unit is not needed.

In the stereoscopic imaging device according to the above-mentioned aspect of the present invention, the set information may include aperture setting information. When the aperture setting information is closer to an aperture side than to a predetermined aperture value, the determination unit may determine that the shading correction by the correction unit is needed.

In the stereoscopic imaging device according to the above-mentioned aspect of the present invention, the set information may include zoom position setting information. When the aperture setting information is closer to an opening side than to the predetermined aperture value and the zoom position setting information is closer to a wide side than to a predetermined zoom position, the determination unit may determine that the shading correction by the correction unit is needed.

The stereoscopic imaging device according to the above-mentioned aspect of the present invention may further include a filtering unit that filters the reference data and each of the plurality of images using a low-pass filter and outputs the filtered reference data and the filtered plurality of images. When the aperture setting information is closer to the opening side than to the predetermined aperture value and the zoom position setting information is closer to a telephoto side than to the predetermined zoom position, the determination unit may determine that the shading correction by the correction unit is needed. When the determination unit determines that the shading correction by the correction unit is needed, the correction unit may compare the reference data and each of the plurality of images output from the filtering unit to determine the amount of shading correction for each of the plurality of images and correct the shading of each of the plurality of images on the basis of the determined amount of shading correction.

In order to achieve the object, according to another aspect of the present invention, there is provided a shading correction method that is performed by a stereoscopic imaging device which outputs a plurality of images with a phase difference caused by pupil division for a beam emitted from a single imaging optical system and can restore a stereoscopic image with a parallax corresponding to the phase difference from the plurality of images. The shading correction method includes: composing the plurality of images and outputting reference data for shading correction on the basis of the composite image of the plurality of images; and comparing the reference data output from the composition unit with each of the plurality of images to determine the amount of shading correction for each of the plurality of images and performing the shading correction on each of the plurality of images on the basis of the determined amount of shading correction.

A plurality of images obtained by a stereoscopic imaging device according to the present invention have the shading of an object in a pupil division direction. Therefore, when the plurality of images are composed, reference data in which shading is cancelled is generated. The amount of shading correction for each of the plurality of images is determined on the basis of the reference data and shading correction can be performed for each of the plurality of images on the basis of the determined amount of shading correction.

BRIEF DESCRIPTION OF THE DRAWINGS

FIG. 5 is a diagram illustrating the detailed structure of a correction unit according to a first embodiment.

DESCRIPTION OF THE PREFERRED EMBODIMENTS

First Embodiment

Hereinafter, a single-eye stereoscopic imaging device according to an embodiment of the present invention will be described with reference to the accompanying drawings.

Overall Structure of Imaging Device

Figure 1:
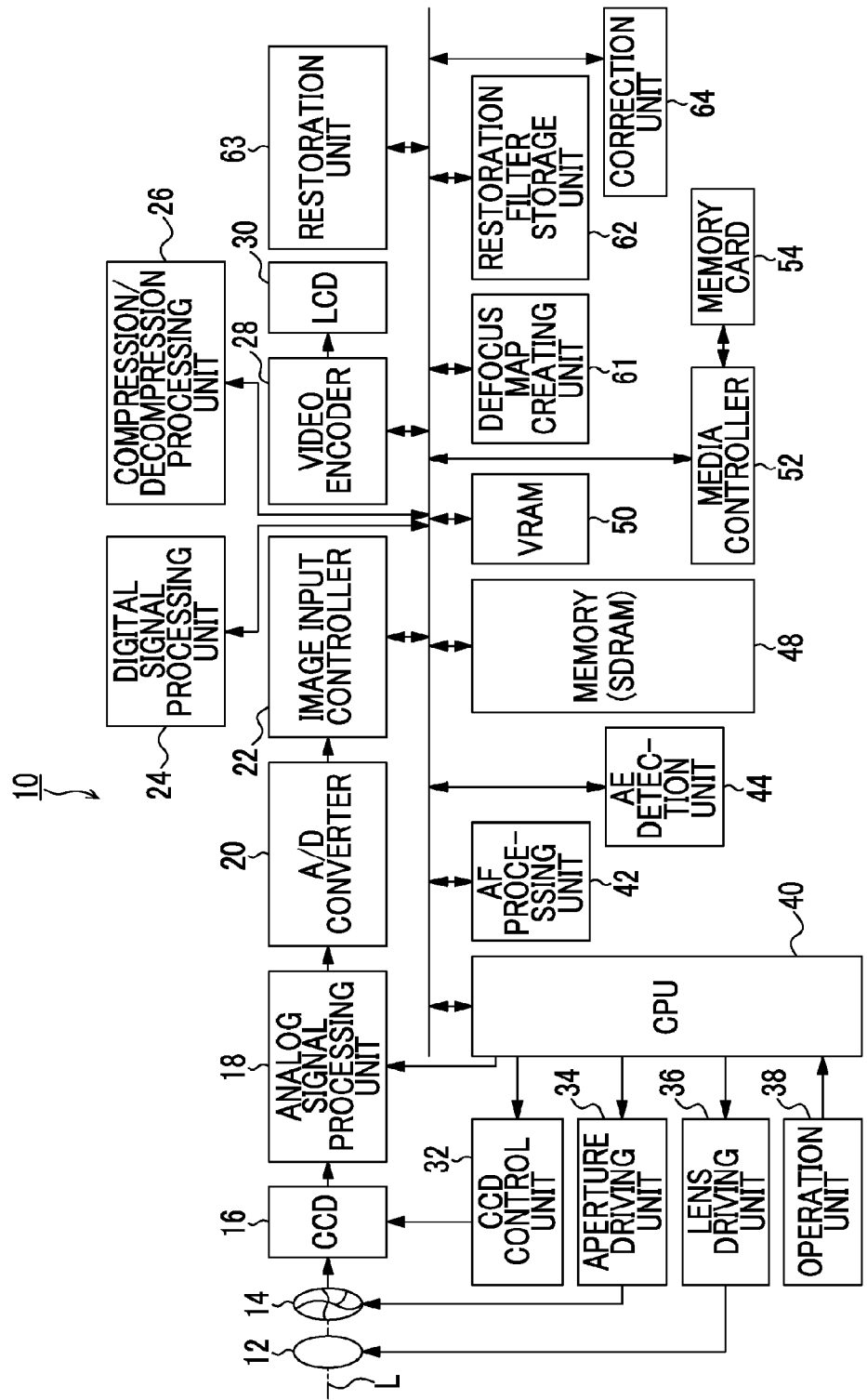
FIG. 1 is a block diagram illustrating a single-eye stereoscopic imaging device.

FIG. 1 is a block diagram illustrating a single-eye stereoscopic imaging device 10 according to an embodiment of the present invention.

The single-eye stereoscopic imaging device 10 records a captured image on a memory card 54 and the overall operation of the device is controlled by a central processing unit (CPU) 40.

The single-eye stereoscopic imaging device 10 is provided with an operation unit 38 including, for example, a shutter button, a mode dial, a reproduction button, a MENU/OK key, an arrow key, and a BACK key. Signals are input from the operation unit 38 to the CPU 40 and the CPU 40 controls each circuit of the single-eye stereoscopic imaging device 10 on the basis of the input signals to perform, for example, lens driving control, aperture driving control, imaging operation control, image processing control, image data recording/reproduction control, and display control of a liquid crystal monitor 30 for stereoscopic display.

The shutter button is an operation button for inputting an instruction to start an imaging operation and includes a two-stage stroke switch including a switch S1 which is turned on when the shutter button is pressed halfway and a switch S2 which is turned on when the shutter button is fully pressed. The mode dial receives the setting of a stereoscopic image capture mode in which a stereoscopic image is captured and a planar image capture mode in which a planar image is captured. The stereoscopic image capture mode and the planar image capture mode are branched into a still image mode or a moving image mode and one of the modes can be selected.

The reproduction button is used to switch the operation mode to a reproduction mode in which the still image or the moving image of the captured and recorded stereoscopic image (3D image) and planar image (2D image) is displayed on the liquid crystal monitor 30. The MENU/OK key is an operation key which functions as a menu button for displaying a menu on the screen of the liquid crystal monitor 30 and an OK button for deciding and executing the selected content. The arrow key is an operation key for inputting instructions in four directions, that is, the up, down, left, and right sides and functions as a button which is used to select an item from a menu screen or select various kinds of settings from each menu button (cursor moving means). In addition, in the arrow key, an up/down key functions as a zoom switch in the imaging mode or a reproduction zoom switch in the reproduction mode and a left/right key functions as a frame advance button (forward/backward) in the reproduction mode. The BACK key is used to, for example, delete a desired target, such as a selected item, a cancel instruction, or return to the previous operation state.

In the imaging mode, image light indicating an object is focused on a light receiving surface of an imaging unit (hereinafter, referred to as a "CCD") 16, which is a phase difference image sensor capable of acquiring a pupil division parallax image, through an imaging lens 12 and an aperture 14. The imaging lens 12 is driven by a lens driving unit 36 which is controlled by the CPU 40 and is subjected to, for example, focus control and zoom (focal length) control. The aperture 14 includes, for example, five aperture blades, is driven by an aperture driving unit 33 which is controlled by the CPU 40, and is controlled in five stages at an interval of 1 AV in an aperture value (F number) range of F2.8 to F11.

The CPU 40 controls the aperture 14 through the aperture driving unit 33 and controls the charge storage time (shutter speed) of the CCD 16 or the reading of image signals from the CCD 16 through a CCD control unit 32.

Example of Structure of CCD

Figure 2:
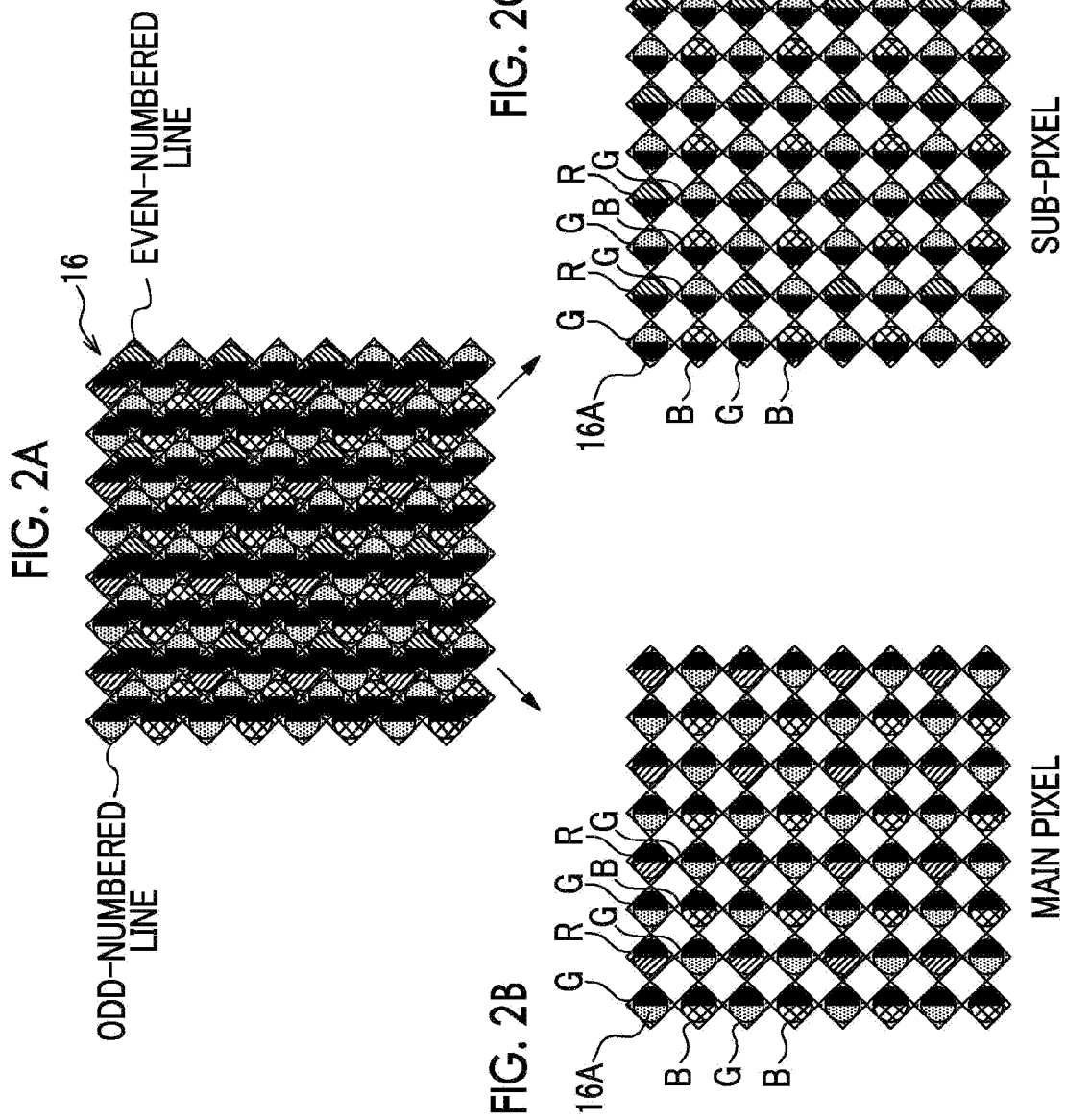
FIGS. 2A to 2C are diagrams illustrating an example of the structure of a pupil division parallax image acquiring imaging element CCD (two viewpoints).

FIGS. 2A to 2C are diagrams illustrating an example of the structure of a two-viewpoint CCD 16.

The CCD 16 includes odd-numbered lines of pixels (main pixels) and even-numbered lines of pixels (sub-pixels) which are arranged in a matrix. Image signals corresponding to two planes which are photoelectrically converted by the main pixels and the sub-pixels can be independently read. A plurality of light receiving elements corresponding to each pixel group form an effective pixel region for obtaining effective imaging signals and an optical black region (hereinafter, referred to as an "OB region") for obtaining a black-level reference signal. In practice, the OB region is formed so as to surround the effective pixel region.

As shown in FIGS. 2A to 2C, in the odd-numbered lines (1, 3, 5, . . . ) of the CCD 16, among the pixels including R (red), G (green), and B (blue) color filters, lines of G, R, R, pixels and lines of B, G, B, G, . . . pixels are alternately provided. In the even-numbered lines (2, 4, 6, . . . ) of pixels, similarly to the odd-numbered lines, lines of G, R, G, R, . . . pixels and lines of B, G, B, G, . . . pixels are alternately provided. For the even-numbered lines of pixels, the pixels are shifted by a half pitch in the line direction.

Figure 3:
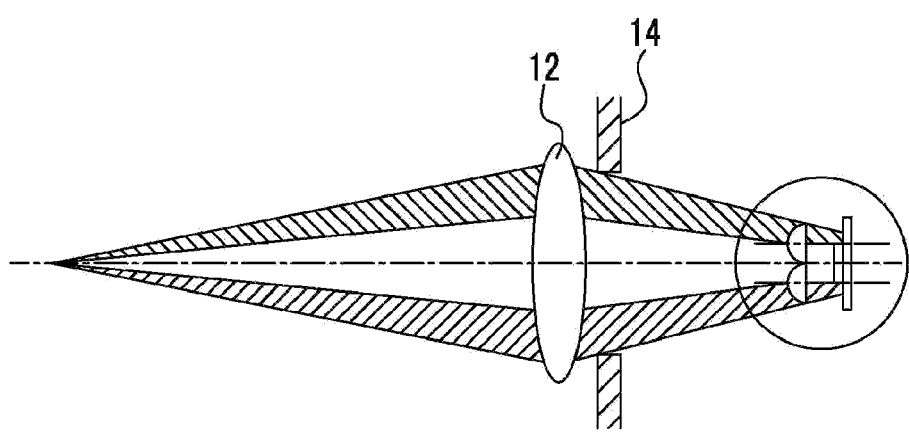
FIG. 3 is a diagram illustrating a main pixel and a sub-pixel.
Figure 4A:
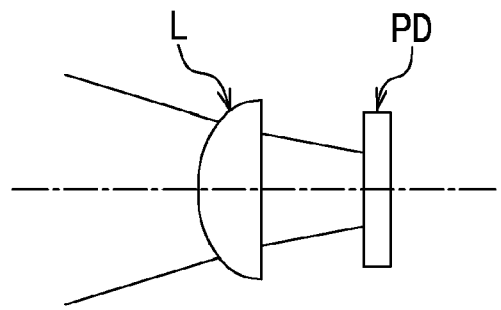
FIG. 4A is an enlarged view illustrating a main portion of FIG. 3.
Figure 4B:
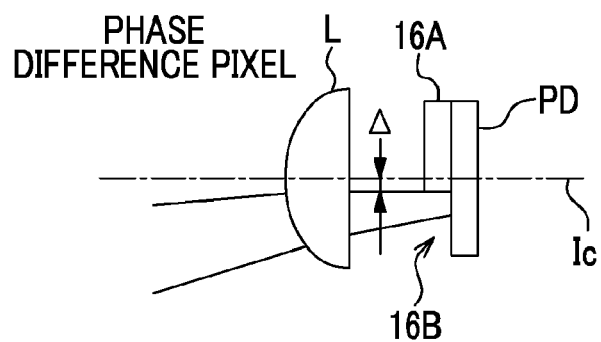
FIG. 4B is an enlarged view illustrating a main portion of FIG. 3.

FIG. 3 is a diagram illustrating the imaging lens 12, the aperture 14, and one main and one sub-pixel of the CCD 16. FIGS. 4A and 4B are enlarged views illustrating a main portion of FIG. 3.

As shown in FIG. 4A, a beam which passes through the exit pupil is incident on the pixel (photodiode (PD)) of the general CCD through a microlens L without any limitations.

In contrast, as shown in FIG. 4B, a light shielding member 16A is formed on the main pixel (plane A) and the sub-pixel (plane B) of the CCD 16. When the single-eye stereoscopic imaging device 10 is arranged laterally and captures an image, the right half or the left half of the light receiving surface of the main pixel and the sub-pixel (photodiode PD) is shielded by the light shielding member 16A. Alternatively, when the single-eye stereoscopic imaging device 10 is arranged longitudinally and captures an image, the upper half or the lower half of the light receiving surface of the main pixel and the sub-pixel (photodiode PD) is shielded by the light shielding member 16A. An opening 16B of the light shielding member 16A is provided at a position which is shifted by a predetermined distance 4 from the optical axis Z of the microlens L in the right, left, up, or down direction (for example, in FIG. 4B, the left direction of the optical axis). A beam passes through the opening 16B and reaches the light receiving surface of the photodiode PD. That is, the light shielding member 16A functions as a pupil division member.

Figure 13:
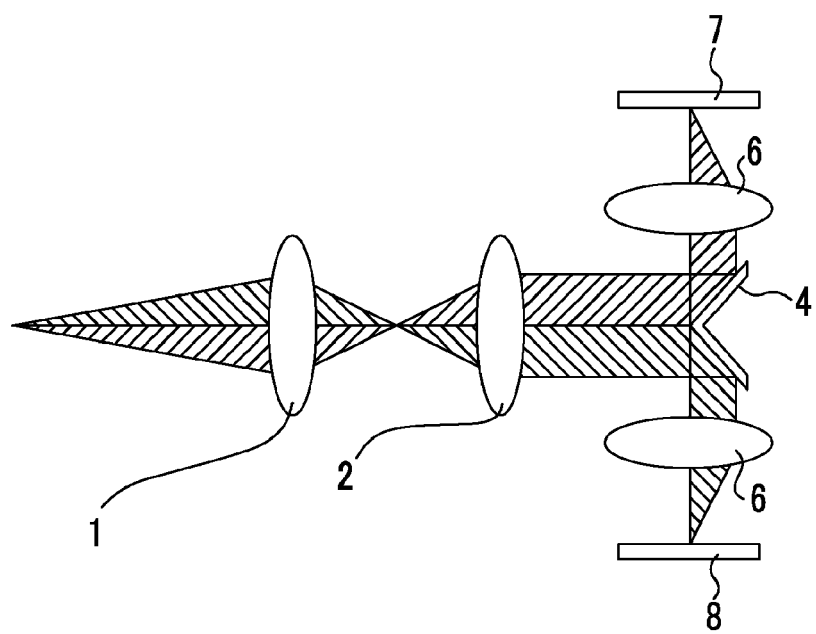
FIG. 13 is a diagram illustrating an example of a single-eye stereoscopic imaging device according to the related art.
Figure 14:
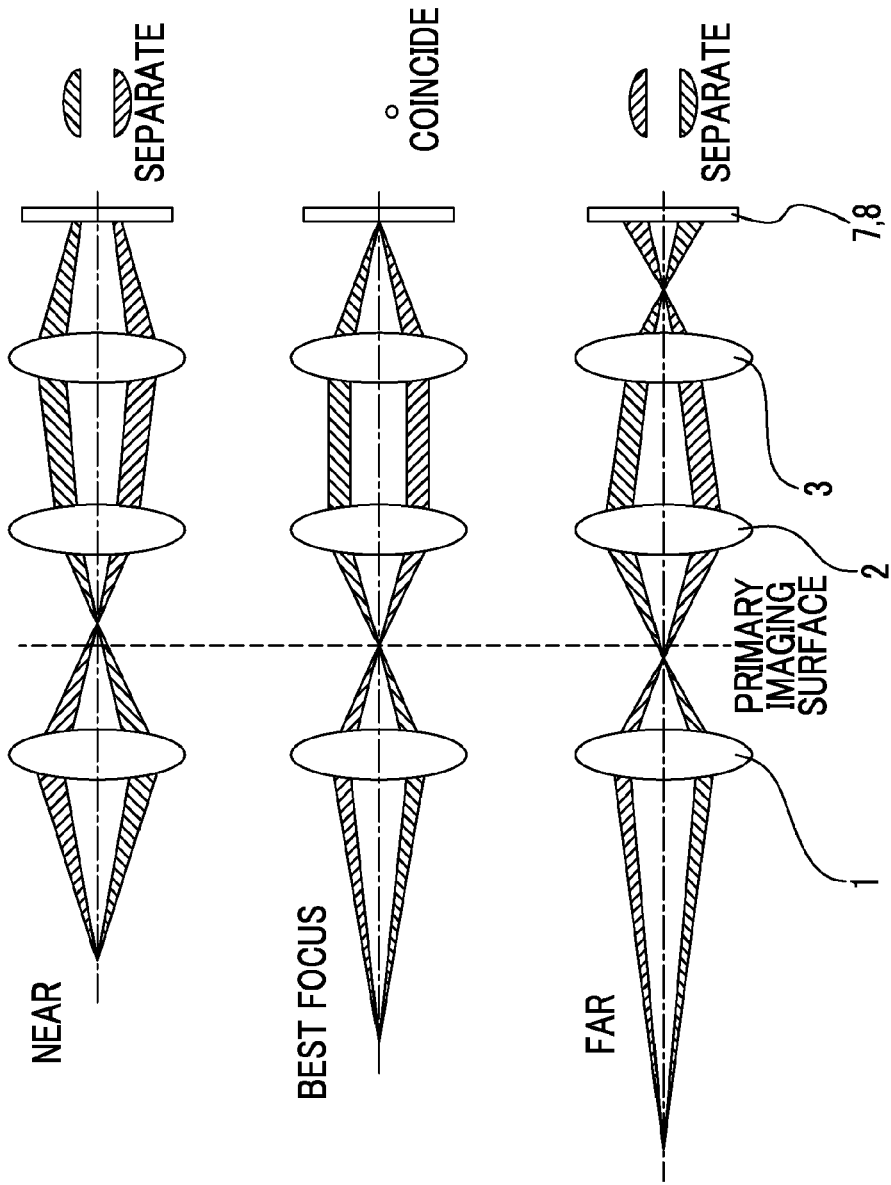
FIG. 14A is a diagram illustrating the separated state of an image formed on an imaging element.
FIG. 14B is a diagram illustrating the separated state of the image formed on an imaging element.
FIG. 14C is a diagram illustrating the separated state of the image formed on an imaging element.

In the main pixel and the sub-pixel, different regions (the right half/the left half or the upper half/the lower half) of the beam are limited by the light shielding member 16A. For example, when the left half of the beam is limited in the main pixel and the right half of the beam is limited in the sub-pixel, a right viewpoint image is obtained from the main pixel and a left viewpoint image is obtained from the sub-pixel. Alternatively, when the upper half of the beam is limited in the main pixel and the lower half of the beam is limited in the sub-pixel, a lower viewpoint image is obtained from the main pixel and an upper viewpoint image is obtained from the sub-pixel. The CCD 16 is configured such that different regions (the right half and the left half) of the beam are limited by the light shielding member 16A in the main pixel and the sub-pixel. However, the structure of the CCD 16 is not limited thereto. For example, the light shielding member 16A may not be provided, the microlens L and the photodiode PD may be shifted relative to each other in the lateral direction, and the beam incident on the photodiode PD may be limited by the shift direction. In addition, one microlens may be provided for two pixels (the main pixel and the sub-pixel) such that the beam incident on each pixel is limited. Furthermore, the pupil may be divided by a mirror (for example, FIG. 13).

Returning to FIG. 1, signal charge stored in the CCD 16 is read as a voltage signal corresponding to the signal charge on the basis of the read signal transmitted from the CCD control unit 32. The voltage signal read from the CCD 16 is transmitted to an analog signal processing unit 18 and R, G, and B signals for each pixel are sampled and held, and amplified by the analog signal processing unit 18. Then, the amplified signals are transmitted to an A/D converter 20. The A/D converter 20 converts the R, G, and B signals which are sequentially input into R, G, and B digital signals and outputs the R, G, and B digital signals to an image input controller 22.

The digital signal processing unit 24 performs predetermined signal processing, such as an offset process, a gain control process including white balance correction and sensitivity correction, a gamma correction process, and a YC process, for the digital image signals which are input through the image input controller 22.

As shown in FIGS. 2B and 2C, main image data read from the main pixels (plane A) in the odd-numbered lines of the CCD 16 is processed as left viewpoint image data and sub-image data read from the sub-pixels (plane B) in the even-numbered lines is processed as right viewpoint image data.

The left viewpoint image data and the right viewpoint image data (3D image data) processed by the digital signal processing unit 24 are input to a VRAM 50. The VRAM 50 includes a region A and a region B each of which stores 3D image data indicating 3D images corresponding to one frame. In the VRAM 50, 3D image data indicating 3D images corresponding to one frame is alternately rewritten to the region A and the region B. Of the regions A and B of the VRAM 50, the written 3D image data is read from the region other than the region to which the 3D image data is written. The 3D image data read from the VRAM 50 is encoded by a video encoder 28 and is input to the liquid crystal monitor (LCD) 30 for stereoscopic display which is provided on the rear surface of the camera. In this way, a 3D object image is displayed on a display screen of the liquid crystal monitor 30.

The liquid crystal monitor 30 is stereoscopic display means which can display stereoscopic images (a left viewpoint image and a right viewpoint image) as directional images with predetermined directivity using a parallax barrier, but the present invention is not limited thereto. For example, the following display means may be used: display means using a lenticular lens; and display means using dedicated glasses, such as polarized glasses or liquid crystal shutter glasses so that the user can separately view the left viewpoint image and the right viewpoint image.

When the shutter button of the operation unit 38 is pressed in a first stage (halfway), the CPU 40 starts an AF operation and an AE operation and controls the lens driving unit 36 such that a focus lens of the imaging lens 12 is disposed at a focal position. In addition, when the shutter button is pressed halfway, image data output from the A/D converter 20 is input to an AE detection unit 44.

The AE detection unit 44 integrates G signals for the entire screen, or integrates the G signals with different weights in a central portion and a peripheral portion of the screen, and outputs the integrated value to the CPU 40. The CPU 40 calculates the brightness (photography exposure value (Ev)) of the object from the integrated value input from the AE detection unit 44, determines the aperture value of the aperture 14 and the electronic shutter (shutter speed) of the CCD 16 on the basis of the photography Ev according to a predetermined program diagram, controls the aperture 14 through the aperture driving unit 33 on the basis of the determined aperture value, and controls the charge storage time of the CCD 16 through the CCD control unit 32 on the basis of the determined shutter speed.

The AF processing unit 42 performs contrast AF processing or phase difference AF processing. When the contrast AF processing is performed, the AF processing unit 42 extracts a high-frequency component of image data in a predetermined focus region of at least one of the left viewpoint image data and the right viewpoint image data and integrates the high-frequency components to calculate an AF evaluation value indicating a focus state. The focus lens of the imaging lens 12 is controlled such that the AF evaluation value is the maximum, thereby performing AF control. When the phase difference AF processing is performed, the AF processing unit 42 detects a phase difference in image data corresponding to the main pixels and the sub-pixels in a predetermined focus region of the left viewpoint image data and the right viewpoint image data and calculates the amount of defocus on the basis of information indicating the phase difference. The focus lens of the imaging lens 12 is controlled such that the amount of defocus is zero, thereby performing AF control.

When the AE operation and the AF operation end and the shutter button is pressed in a second stage (fully), image data corresponding to two images, that is, the left viewpoint image (main image) and the right viewpoint image (sub-image) corresponding to the main pixels and the sub-pixels, which are output from the A/D converter 20 in response to the pressure, is input from the image input controller 22 to a memory (SDRAM) 48 and is temporarily stored therein.

The digital signal processing unit 24 appropriately reads the image data corresponding to two images which is temporarily stored in the memory 48 and performs predetermined signal processing including a process (YC process) of generating brightness data and color difference data of the image data. The image data (YC data) subjected to the YC process is stored in the memory 48 again. Then, the YC data corresponding to two images is output to a compression and decompression unit 26. The compression and decompression unit 26 performs a predetermined compression process, such as JPEG (joint photographic experts group) compression, for the YC data and the compressed YC data is stored in the memory 48 again.

A multi-picture file (MP file: a file in which a plurality of images are connected) is generated from the YC data (compressed data) corresponding to two images which is stored in the memory 48. The MP file is read by a media controller 52 and is recorded on a memory card 54.

The defocus map creating unit 61 calculates the phase difference corresponding to the main pixel and the sub-pixel for each of a plurality of small regions which substantially cover the entire effective pixel region as well as each small region included in a predetermined focus region. The plurality of small regions which substantially cover the entire effective pixel region do not need to completely cover the entire effective pixel region, but may be densely or sparsely arranged in the entire effective pixel region. For example, the phase difference is calculated for each of the divided regions divided from the effective pixel region in a predetermined unit (for example, 8×8 pixels), or a unit (for example, 1×1 pixel) smaller than the predetermined unit or a unit (for example, 10×10 pixels) larger than the predetermined unit. Alternatively, the phase difference is calculated for a predetermined unit of the divided region which is a predetermined pitch (for example, a pitch corresponding to one divided region, a pitch equal to or more than one divided region, or a pitch equal to or less than one divided region) away from the outer edge of the effective pixel region. For example, the phase difference is calculated over the entire effective pixel region, but is not necessarily calculated for all of the small regions forming the effective pixel region.

The defocus map creating unit 61 calculates the amount of defocus corresponding to each of the small regions on the basis of the phase difference which is calculated for each small region. A set of the amounts of defocus corresponding to each small region which are calculated over the entire effective pixel region is referred to as a defocus map. The defocus map creating unit 61 includes a volatile storage medium, such as a RAM, and temporarily stores the calculated defocus map. Since the amount of defocus is equivalent to object distance information, the defocus map is equivalent to the object distance information corresponding to each small region. The defocus map creating unit 61 may detect feature points and corresponding points between the viewpoint images and create the defocus map on the basis of the difference in positional information between the feature points and the corresponding points.

A restoration filter storage unit 62 is a non-volatile storage medium, such as a ROM, and stores restoration filters corresponding to the image height of each small region in each viewpoint image (the distance from the center of the image, typically, the distance from the center L of the optical axis of the optical imaging lens 12) and the amount of defocus (or an object distance).

A restoration unit 63 is formed by an information processing device, for example, the CPU 40, deconvolutes the small regions using a restoration filter which is selected for each small region of each viewpoint image, and restores the small region of the corresponding viewpoint image. In this way, it is possible to give parallax corresponding to the amount of defocus (the amount of blur) to the image.

A correction unit 64 performs a predetermined correction process on the left viewpoint image data and the right viewpoint image data processed by the digital signal processing unit 24. Then, the correction unit 64 stores the corrected left viewpoint image data and right viewpoint image data in the VRAM 50. The correction process may be performed by the correction unit 64 only when a specific condition is satisfied. For example, the correction process is performed when the imaging mode is set to a specific mode by the operation unit 38. Examples of the specific mode include a planar mode and a full pixel recording mode of the planar mode. Alternatively, the correction process may be performed when a specific imaging conditions is satisfied. When the aperture value is less than a given threshold value (for example, F number=2.8), the correction process may be performed.

FIG. 5 shows the detailed structure of the correction unit 64 according to the first embodiment. The correction unit 64 includes a composition processing unit 64a (composition unit) and a correction processing unit 64b. In the first embodiment, the correction unit 64 and the composition processing unit 64a (composition unit) are integrated with each other. However, as another aspect, the correction unit 64 and the composition processing unit 64a (composition unit) may be separately formed.

Figure 6:
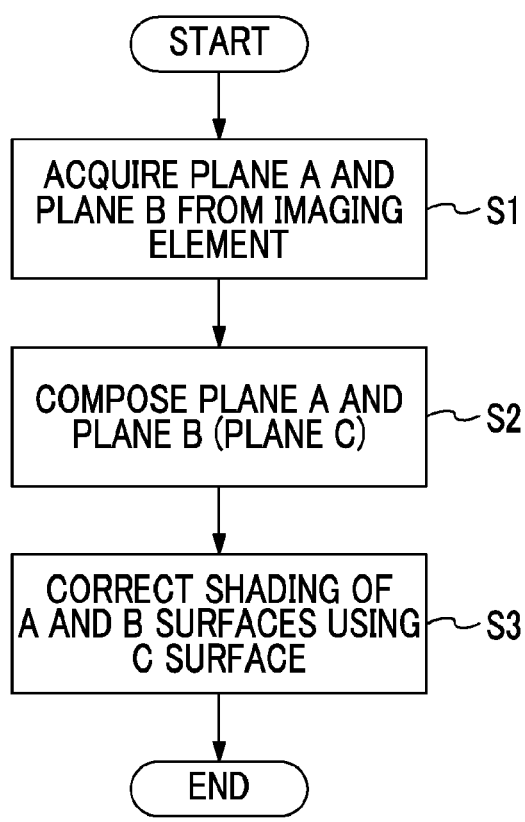
FIG. 6 is a flowchart illustrating a correction process (two viewpoints) performed by the correction unit according to the first embodiment.

FIG. 6 is a flowchart illustrating the correction process performed by the correction unit 64 according to the first embodiment.

In Step S1, the composition processing unit 64a composes left image data read from the main pixel (plane A) and right image data read from the sub-pixel (plane B) to create reference data (plane X) for shading correction. The term "composition" manes adding the image signals.

Figure 7:
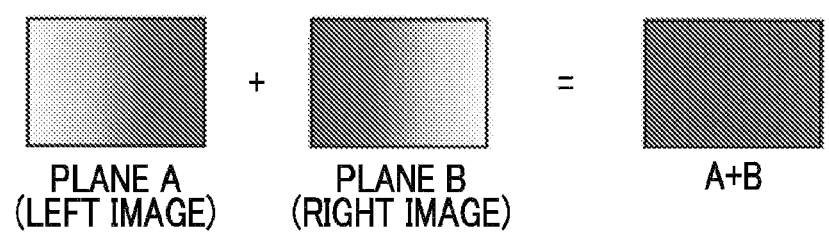
FIG. 7 is a conceptual diagram illustrating reference data (two viewpoints).

FIG. 7 is a conceptual diagram illustrating the reference data. As shown in FIG. 7, image data for the plane A and image data for the plane B have target shading in a pupil division direction, here, the parallax direction of both eyes, that is, the left and right eyes. Therefore, when the image data for the plane A and the image data for the plane B are composed, the reference data in which shading is cancelled is generated.

Returning to FIG. 6, in Step S2, the correction processing unit 64b compares the reference data with the image data for the plane A, compares the reference data with the image data for the plane B, determines the amounts of correction for the planes A and B, and performs shading correction for the image data for the plane A and the image data for the plane B on the basis of the determined amounts of correction. When the memory 48 can store the plane A, the plane B, and the reference data at the same time, the plane A, the plane B, and the reference data are stored in the memory 48. Then, the reference data is compared with the image data for the plane A and the image data for the plane B on the memory and the shading correction is performed.

The shading correction is performed such that the image data for the plane A and the image data for the plane B have the same brightness as the reference data. The detailed shading correction method is as follows, but the present invention is not limited thereto.

For example, the correction processing unit 64b partitions the reference data into a plurality of small regions and partitions each of the image data for the plane A and the image data for the plane B into small regions in the same unit as the reference data. The correction processing unit 64b calculates an average density value for each small region of the reference data. The correction processing unit 64b calculates an average density value for each of the corresponding small regions of both the image data for the plane A and the reference data. The correction processing unit 64b calculates the difference between the average density values of the small regions of the two data items to determine the amount of correction for each small region. Then, the correction processing unit 64b adds, to image data obtained from each pixel of the image data for the plane A, the amount of correction (difference value) corresponding to the small region including the pixels. The correction processing unit 64b performs the same correction amount process as that for the plane A and the correction process based on the amount of correction on the image data for the plane B.

For example, it is assumed that the average density value of the small regions $\Delta i$ of the reference data is Mi, the average density value of the small regions $\delta i$ of the image data for the plane A corresponding thereto is mi, and a density difference di between the small regions $\Delta i$ is Mi−mi. When a given pixel P in the image data for the plane A or the plane B belongs in the small region $\delta i$ and the density thereof is Yi, the correction processing unit 64b calculates the corrected density Yi' of the pixel P as follows: Yi'=Yi+di.

Alternatively, similarly to the above, the correction processing unit 64b calculates the average density value for each small region in both the image data for the plane A and the reference data. The correction processing unit 64b calculates the ratio of the density average values of corresponding small regions in the two image data items to determine the amount of correction for each small region. Then, the correction processing unit 64b adds, to image data obtained from each pixel of the image data for the plane A, the amount of correction (density ratio) corresponding to the small region including the pixels. The correction processing unit 64b performs the same process as that for the image data for the plane A on the image data for the plane B.

For example, it is assumed that the average density value of the small region $\Delta i$ of the reference data is Mi, the average density value of the small region $\delta i$ of the image data for the plane A corresponding thereto is mi, and the ratio ri of the small regions $\Delta i$ is Mi/mi. When a given pixel P in the image data for the plane A or the plane B belongs to the small region $\delta i$ and the density thereof is Yi, the correction processing unit 64b calculates the corrected density Yi' of the pixel P as follows: Yi'=Yi*ri.

Alternatively, a low-frequency component of the image data for the plane X may be added to a high-frequency component of the image data for the planes A and B.

Figure 8:
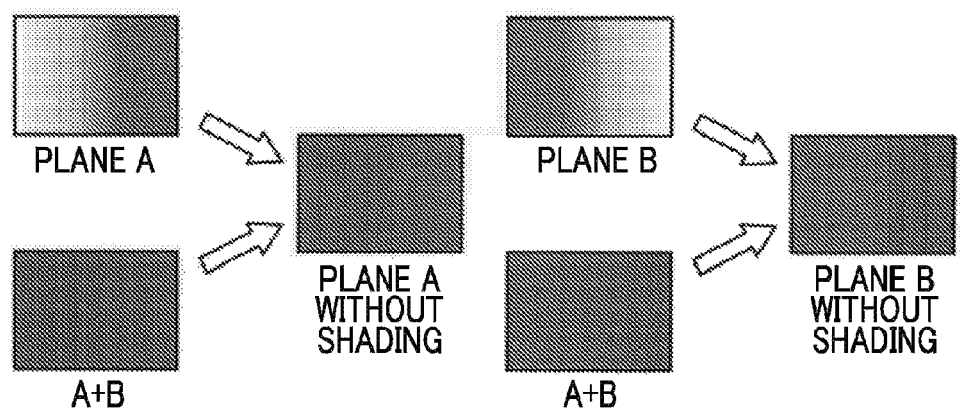
FIG. 8 is a conceptual diagram illustrating shading correction (two viewpoints).

That is, as shown in FIG. 8, the density of the pixels of the plane A and the plane B affected by shading is compensated by the density of the reference data which is not affected by shading to remove shading distortion from the left viewpoint image data and the right viewpoint image data.

When it is not necessary to separately calculate the amount of correction (the density difference di or the density ratio ri) for each pixel of the plane A and the plane B in order to perform correction, a thinning unit (not shown) thins out the images of the planes A and B with a predetermined size, composes the thinned planes A and B images to create reference data with a reduced size, and calculates the amount of correction for each small region of the plane A and the plane B on the basis of the reference data. At that time, the size of the small region of the reference data is not equal to that of the small region of the images of the planes A and B. Therefore, each pixel of each small region of the reference data is interpolated with the peripheral pixels and the correspondence between the small regions of the images of the plane A and B and the small regions of the reference data is maintained, such that the sizes are equal to each other. In addition, shading correction may be performed for each of the corresponding small regions of the images of the planes A and B on the basis of the amount of correction which is determined for each of the interpolated small regions. A method of creating the reference data with a reduced size is not limited to the above. For example, the images of the planes A and B may be composed and an image with a predetermined size may be thinned out from the composite image.

In Step S3, the correction processing unit 64b stores the shading-corrected left and right viewpoint image data items in the VRAM 50. The left and right viewpoint image data items may be used as a stereoscopic image or a planar image. For example, when the planar image recording mode is set, the left and right viewpoint image data items may be composed into a high-resolution planar image and the planar image may be compressed and recorded as a full-pixel planar image on the memory card 54. Alternatively, when the stereoscopic image recording mode is set, the left and right viewpoint image data items may be separately compressed and recorded as a stereoscopic image on the memory card 54.

Second Embodiment

Figure 9:
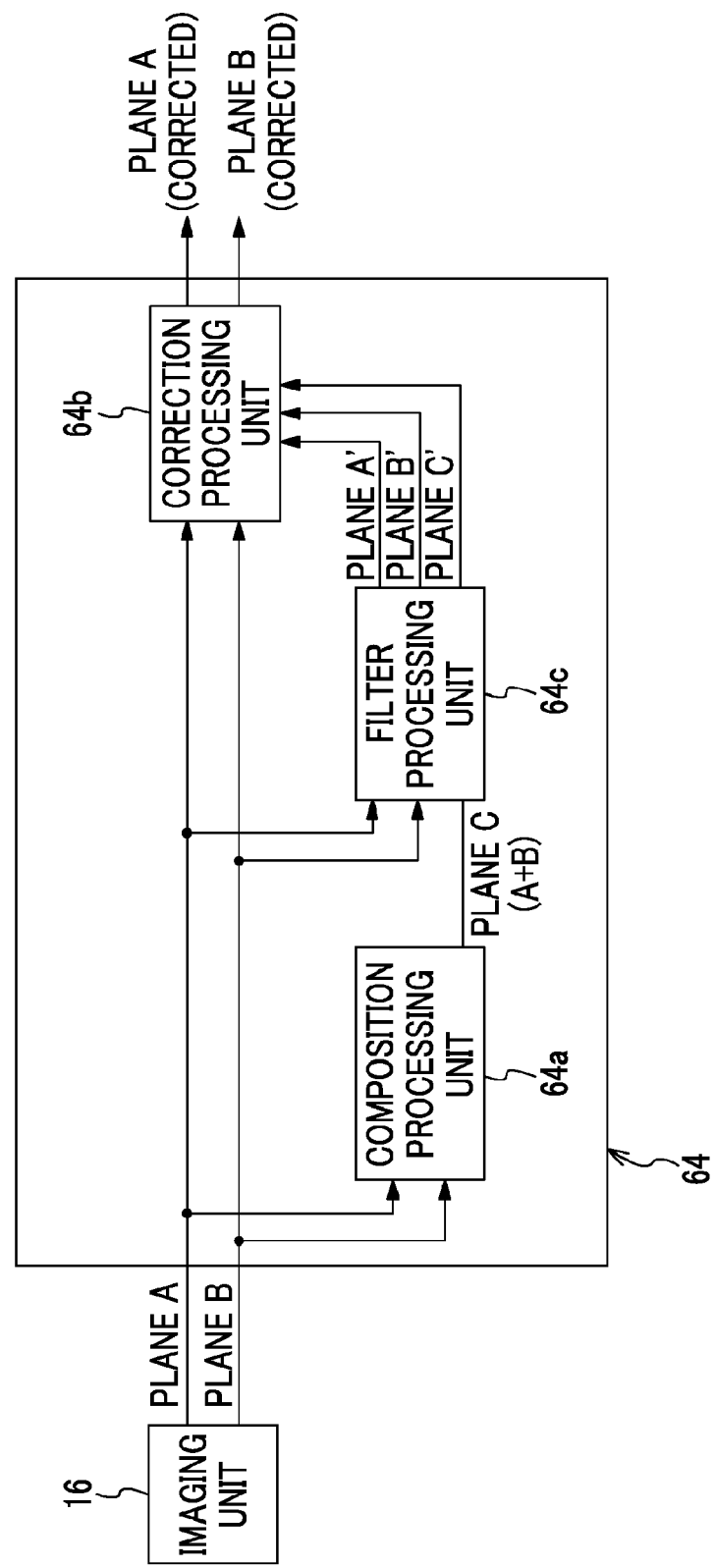
FIG. 9 is a diagram illustrating the detailed structure of a correction unit according to a second embodiment.

FIG. 9 is a diagram illustrating the detailed structure of a correction unit 64 according to a second embodiment. The correction unit 64 includes a composition processing unit 64a, a correction processing unit 64b, and a filter processing unit 64c (filtering unit). The filter processing unit 64c is a low-pass filter and suppresses the contour of image data so as to be unclear.

Figure 10:
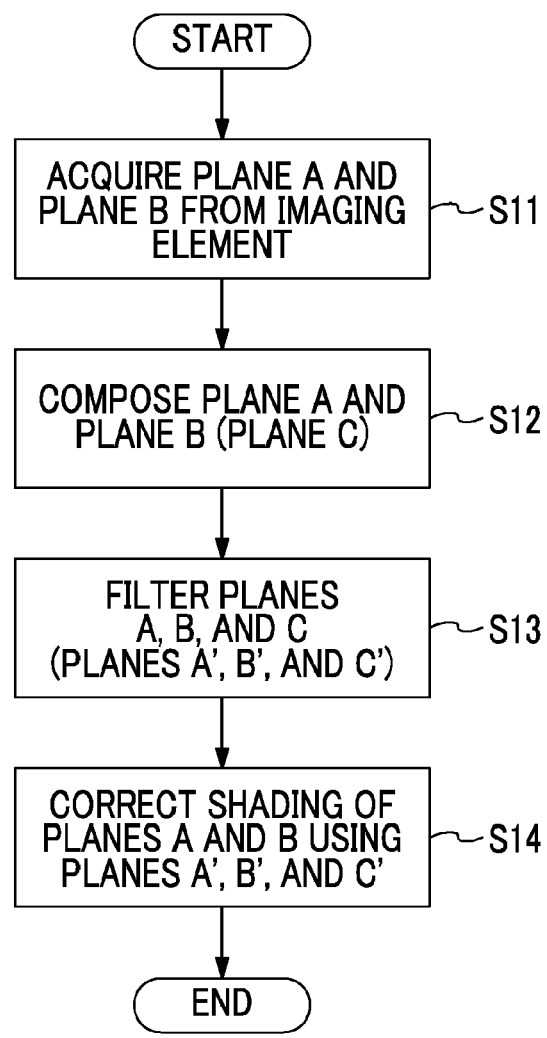
FIG. 10 is a flowchart illustrating a correction process performed by the correction unit according to the second embodiment.

FIG. 10 is a flowchart illustrating a correction process performed by the correction unit 64 according to the second embodiment.

Steps S11 and S12 are the same as Steps S1 and S2.

In Step S13, the filter processing unit 64c filters reference data and image data for the planes A and B output from the composition processing unit 64a and outputs the filtered reference data and image data for the planes A and B as new reference data and new image data for the planes A and B to the correction processing unit 64b.

In Step S14, the correction processing unit 64b performs the same correction process as that in Step S4 on the reference data and the image data for the planes A and B which are output from the filter processing unit 64c.

The filtering makes it possible to remove the phase difference (the amount of defocus or the amount of blur) between the image data for the plane A and the image data for the plane B and thus to effectively cancel shading due to composition. The same filtering process as described above is performed on the image data for the plane A and the image data for the plane B in order to accurately calculate the amount of correction (the density difference di or the density ratio ri).

Third Embodiment

Figure 11:
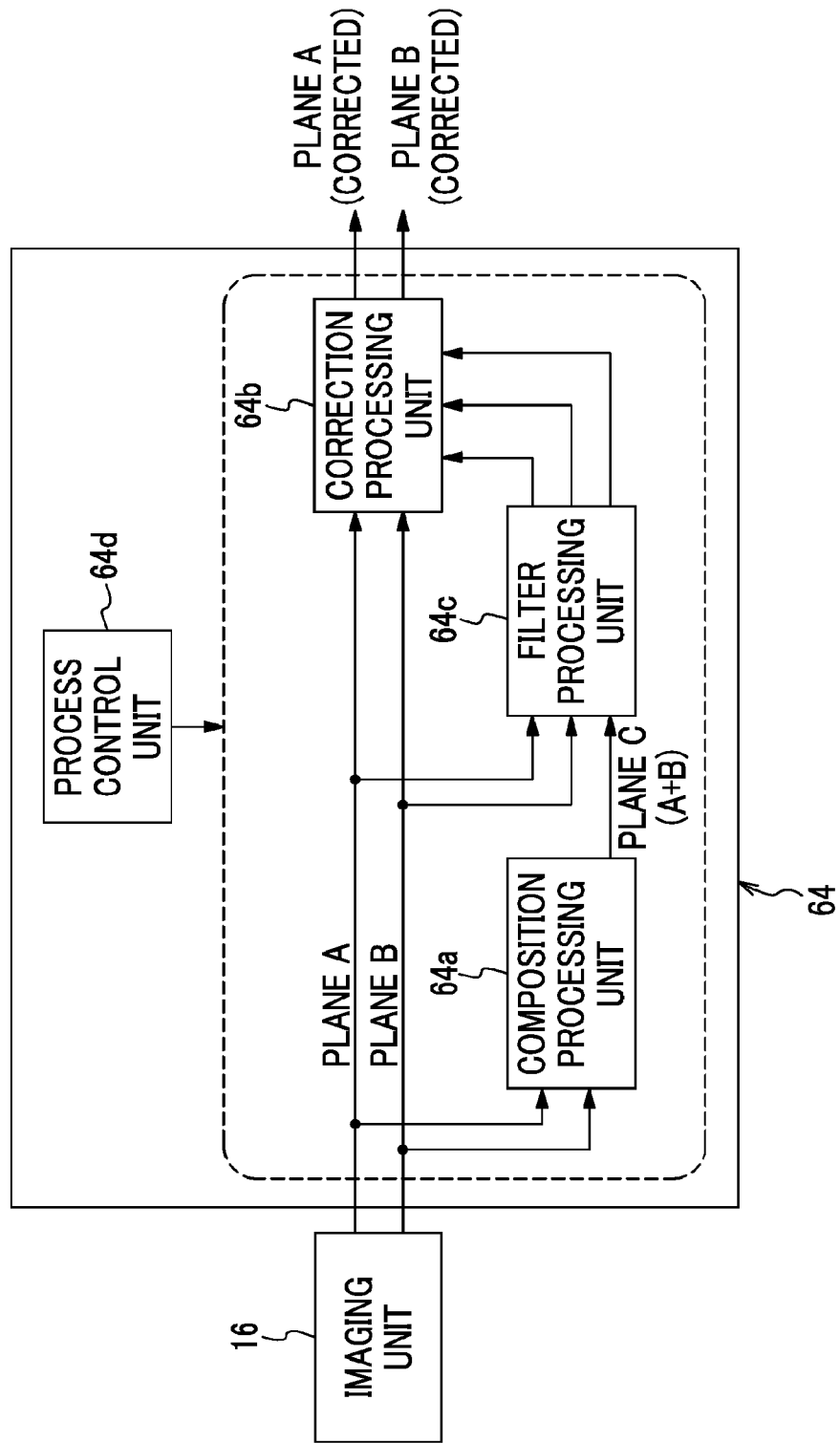
FIG. 11 is a diagram illustrating the detailed structure of a correction unit according to a third embodiment.

FIG. 11 shows the detailed structure of a correction unit 64 according to a third embodiment. The correction unit 64 further includes a process control unit 64d. The process control unit 64d is an information process device, such as a CPU, and controls whether to perform a correction process using a correction processing unit 64b according to imaging conditions and the imaging mode.

Figure 12:
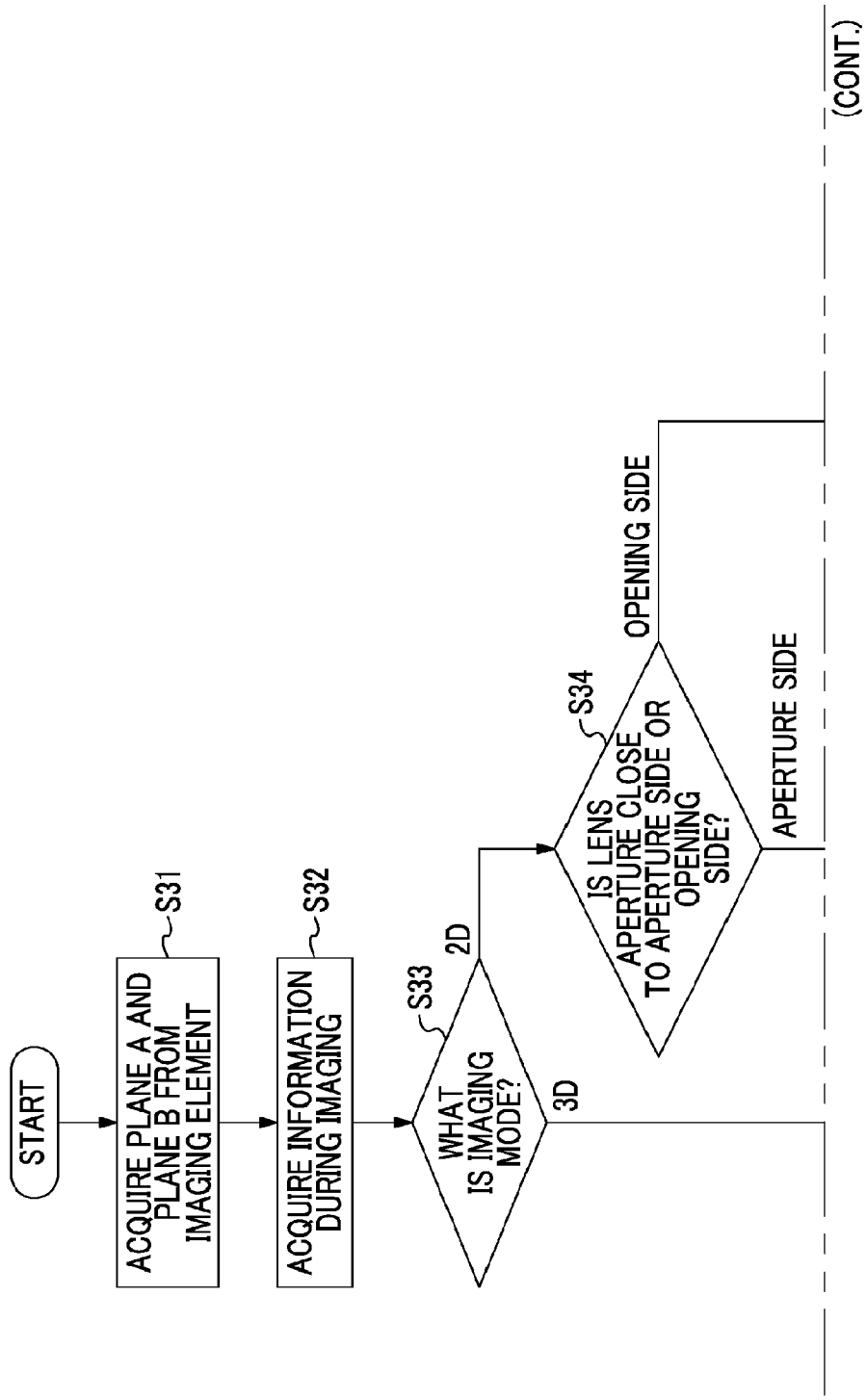
FIG. 12 is a flowchart illustrating a correction process performed by a correction unit according to a fourth embodiment.

FIG. 12 is a flowchart illustrating a correction process performed by the correction unit 64 according to the third embodiment.

Step S31 is the same as Step S1.

In Step S32, the process control unit 64d checks the imaging conditions and the imaging mode (set information) set by, for example, a CPU 40 at the time when image data for the planes A and B is acquired (when the shutter is fully pressed). The imaging conditions include, for example, the zoom position (focal length) of an imaging lens 12 and the aperture value of an aperture 14. Examples of the imaging mode include a stereoscopic image capture mode, a planar image capture mode, and a full pixel recording mode.

In Step S33, the process control unit 64d determines whether the imaging mode which is set when the image data for the planes A and B is acquired is the stereoscopic image capture mode or the planar image capture mode using a determination unit (not shown). When the imaging mode is the stereoscopic mode, the process ends. When the imaging mode is the planar mode, the process proceeds to Step S34.

In Step S34, the process control unit 64d determines whether the aperture value of the aperture 14 which is set when the image data for the planes A and B is acquired is less than a predetermined threshold value (for example, F number=2.8) (opening side) or not (aperture side). When the aperture value is close to the aperture side, the process proceeds to Step S36. When the aperture value is close to the opening side, the process proceeds to Step S35.

In Step S35, the process control unit 64d determines whether the zoom position of the imaging lens 12 which is set when the image data for the planes A and B is acquired is close to the wide side or the telephoto side from the middle point of the zoom position between the telephoto end and the wide end. When the zoom position is close to the wide side, the process proceeds to Step S36. When the zoom position is close to the telephoto side, the process proceeds to Step S38.

Steps S36 and S37 are the same as Steps S2 and S3.

Steps S38 and S39 are the same as Steps S12 to S14.

For example, according to the above-mentioned process, in the stereoscopic mode, the correction process is not performed. This is because there is not very much influence of shading and the observer does not care about shading in the stereoscopic image. In the planar mode, the correction process is performed. However, when the aperture 14 is opened and the imaging lens 12 is on the telephoto side, the influence of shading is large and the correction process for filtering is performed. The branch conditions of Steps S33, S34, and S35 are an illustrative example, and steps may be branched on the basis of whether other conditions are satisfied.

As such, the correction process is performed on the basis of whether shading correction is needed and the strength of the influence of shading. Therefore, it is possible to obtain a high-quality image without performing an unnecessary process.

Fourth Embodiment

The two-viewpoint CCD 16 according to the first embodiment may be a CCD which acquires a four-viewpoint or nine-viewpoint phase difference image, and the correction process according to the first to third embodiments may be applied to the four-viewpoint or nine-viewpoint phase difference image.

Figure 15:
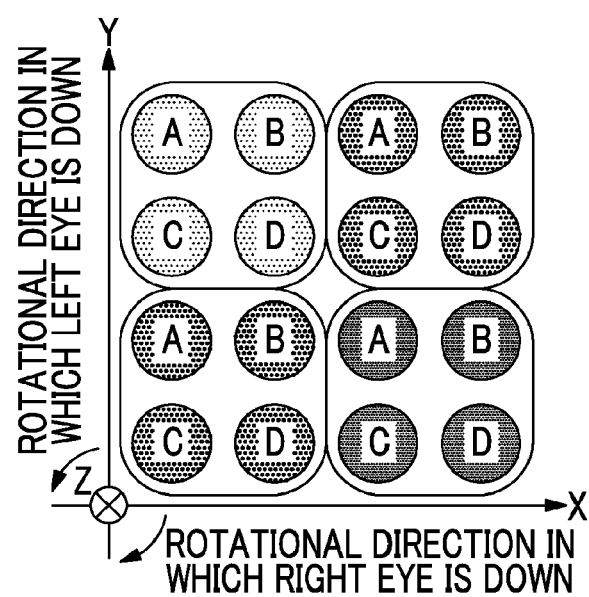
FIG. 15 is a diagram illustrating an example of the structure of a pupil division parallax image acquiring imaging element CCD (four viewpoints).

FIG. 15 is a diagram illustrating an example of the structure of a four-viewpoint CCD 16.

As shown in FIG. 15, a red, blue, or green color filter, a four-viewpoint pixel group which includes pixels A, B, C, and D and corresponds to the color filter, and a microlens ML corresponding to the four-pixel group are arranged on a light receiving surface of the CCD 16. Light receiving units each including the color filter, the four-pixel group, and the microlens are arranged in a Bayer pattern.

In the Bayer pattern, when three primary color filters, that is, red (R, r), green (G, g), and blue (B, b) color filters are arranged on the four pixel groups which are formed in a square lattice shape on the surface of a semiconductor substrate of the CCD 16, rows in which the red and green filters are alternately arranged and rows in which the green and blue filters are alternately arranged are alternately arranged in the column direction.

In FIG. 15, the XY plane is the light receiving surface of the CCD 16, the X direction is the row direction, and the Y direction is the column direction. As viewed from the photographer, pixels A and C are disposed on the left side and pixels B and D are disposed on the right side. It is assumed that Z is the optical axis direction of a lens 12 and the direction toward the object (the direction from the plane of paper to the rear side in FIG. 15) is a positive direction. Hereinafter, image data items read from the pixels A, B, C, and D are referred to as image data for the plane A, image data for the plane B, image data for the plane C, and image data for the plane D, respectively.

In the Bayer pattern, when three primary color filters, that is, red (R, r), green (G, g), and blue (B, b) color filters are arranged on the four pixel groups which are formed in a square lattice shape on the surface of a semiconductor substrate of the CCD 16, rows in which the red and green filters are alternately arranged and rows in which the green and blue filters are alternately arranged are alternately arranged in the column direction.

Figure 16:
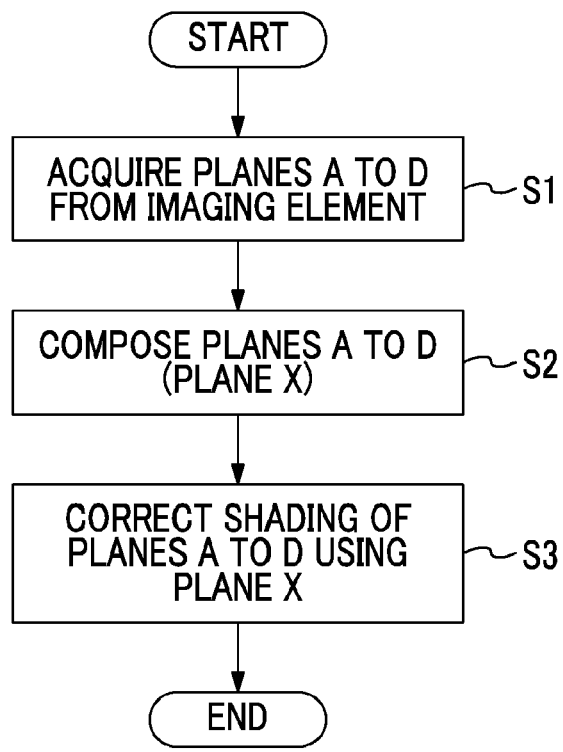
FIG. 16 is a flowchart illustrating a correction process (four viewpoints) performed by the correction unit according to the first embodiment.
Figure 17:
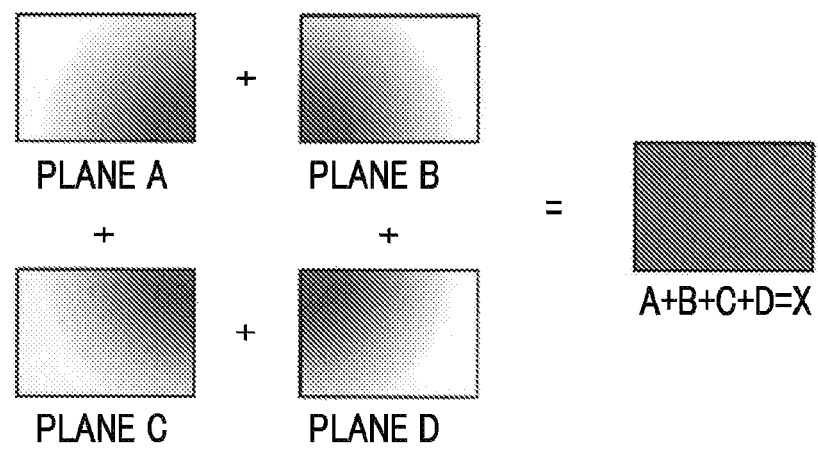
FIG. 17 is a conceptual diagram illustrating reference data (four viewpoints).
Figure 18:
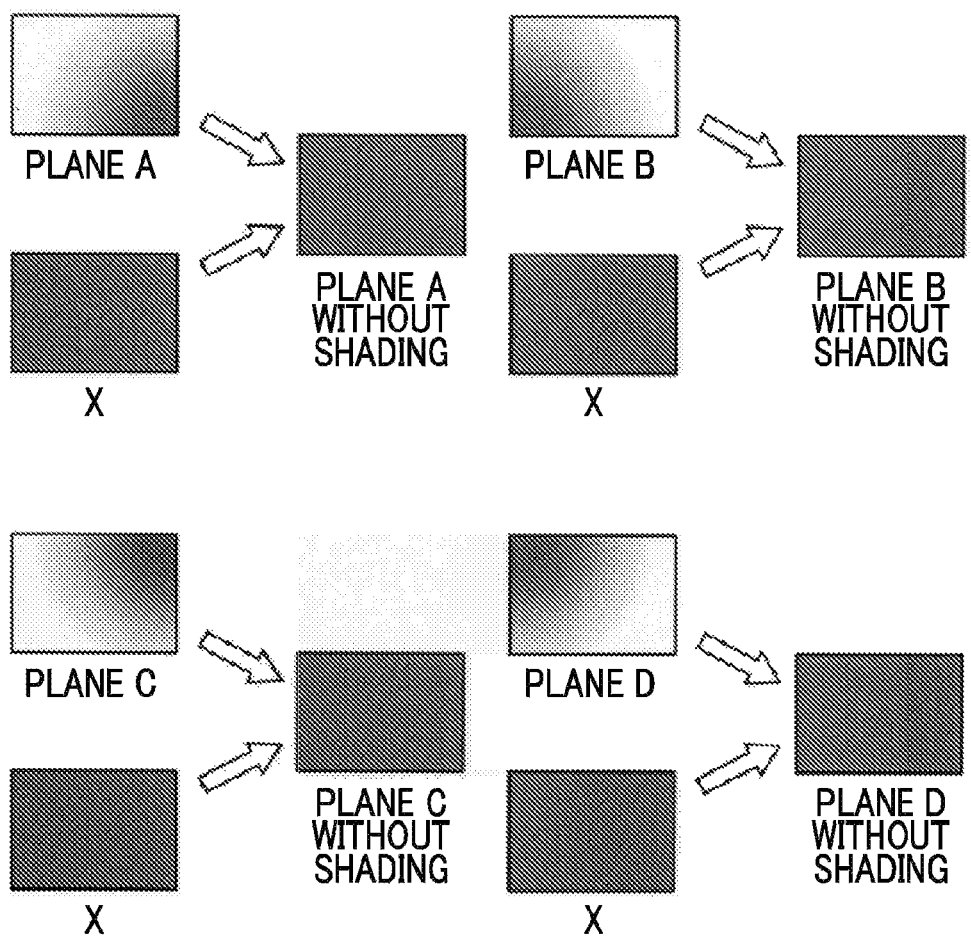
FIG. 18 is a conceptual diagram illustrating shading correction (four viewpoints).

A correction process at four viewpoints is performed as follows. That is, as shown in FIG. 16, in Step S1, the image data items for the planes A to D is acquired. In Step S2, all of the image data items for the planes A to D are composed to obtain reference data X without shading (see FIG. 17). In Step S3, the reference data is compared with each of the image data items for the planes A to D to determine the amounts of correction for the planes A to D. Then, the planes A to D are corrected with the amounts of correction to obtain image data items for the planes A to D without shading (see FIG. 18).

Figure 19:
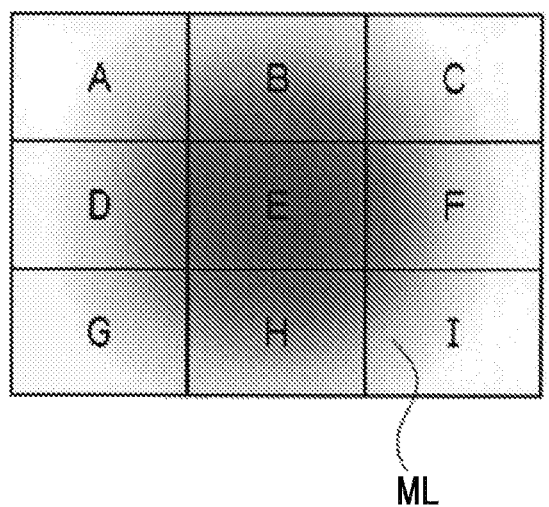
FIG. 19 is a diagram illustrating an example of the structure of a pupil division parallax image acquiring imaging element CCD (nine viewpoints).

The structure of a nine-viewpoints CCD 16 is the same as that shown in FIG. 4 and described in paragraph [0033] of the specification disclosed in JP2008-172321A. As shown in FIG. 19, a red, blue, or green color filter, a nine-viewpoint pixel group which includes pixels A, B, C, D, E, F, G, H, and I and corresponds to the color filter, and a microlens ML corresponding to the nine-pixel group are arranged on the light receiving surface of the CCD 16. Light receiving units including the color filter, the nine-pixel group, and the microlens are arranged in the Bayer pattern.

Figure 20:
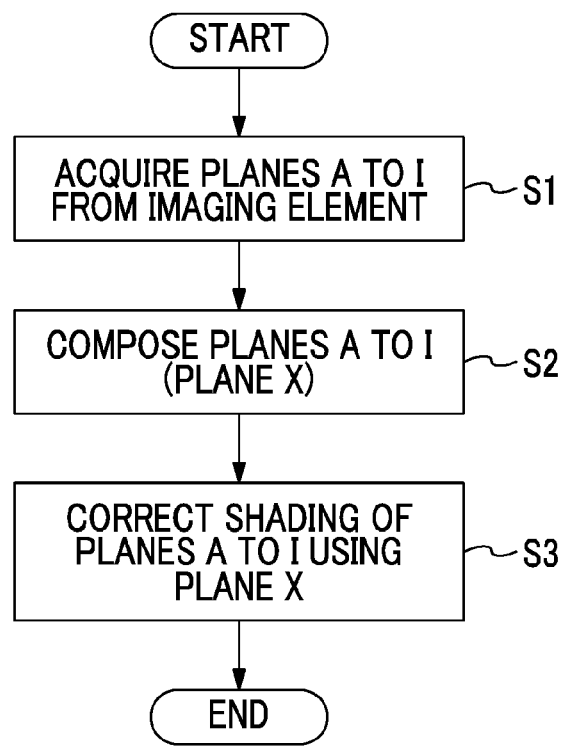
FIG. 20 is a flowchart illustrating a correction process (nine viewpoints) performed by the correction unit according to the first embodiment.
Figure 21:
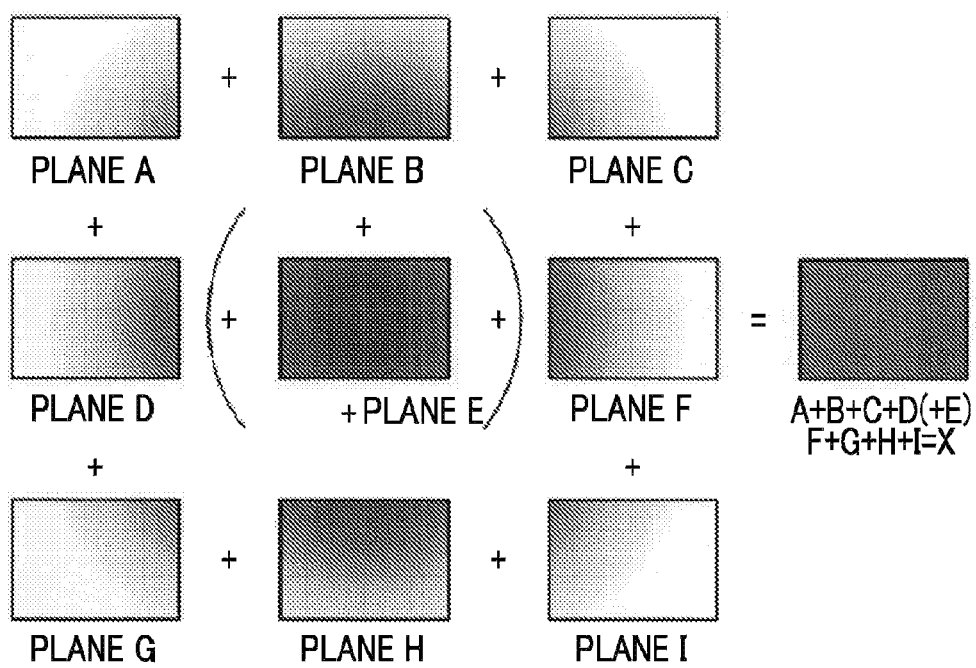
FIG. 21 is a conceptual diagram illustrating reference data (nine viewpoints).
Figure 22:
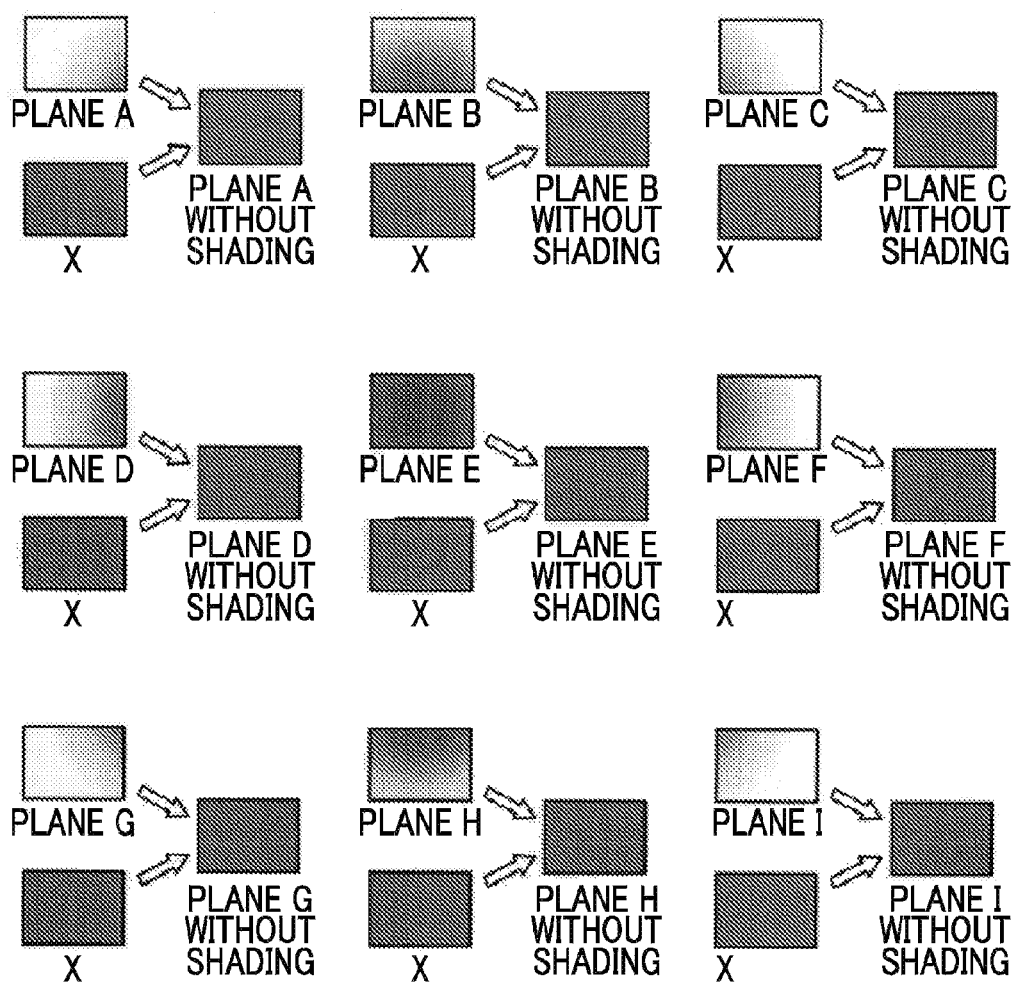
FIG. 22 is a conceptual diagram illustrating shading correction (nine viewpoints).

A correction process at nine viewpoints is performed as follows. That is, as shown in FIG. 20, in Step S1, image data items for the planes A to I are acquired. In Step S2, all of the image data items for the planes A to I are composed to obtain reference data without shading (see FIG. 21). However, since there is no shading or little shading in the central pixel E, the image data items for the planes A to I except for the plane E may be composed to obtain reference data without shading. The image data for the plane E may be used as the reference data. In Step S3, the reference data is compared with each of the image data items for the planes A to I to determine the amounts of correction for the planes A to I, and the planes A to I are corrected with the amounts of correction to obtain image data items for the planes A to D without shading (see FIG. 22). When the plane E is not used to compose the reference data, it is not necessary to perform the process of determining the amount of correction for the plane E and the process of correcting the image data for the plane E. In addition, the thinned image may be used to create the reference data, which holds for any of the two-viewpoint CCD 16, the four-viewpoint CCD 16, and the nine-viewpoint CCD 16.

The correction process (FIG. 10) according to the second embodiment and the correction process (FIG. 12) according to the third embodiment can be applied to any of the two-viewpoint CCD 16, the four-viewpoint CCD 16, and the nine-viewpoint CCD 16.

For example, in the case of the four-viewpoint CCD 16, in Step S13 of the correction process according to the second embodiment, the image data items for the planes A to D are filtered. In Step S14, the filtered image data items for the planes A to D are compared with the filtered image data for the plane X to determine the amount of correction for the filtered image data items for the planes A to D, and the filtered image data items for the planes A to D are corrected with the amount of correction. In the case of the nine-viewpoint CCD 16, in Step S13 of the correction process according to according to the second embodiment, the image data items for the planes A to I are filtered. In Step S14, the filtered image data items for the planes A to I are compared with the filtered image data for the plane X to determine the amounts of correction for the filtered image data items for the planes A to I, and the filtered image data items for the planes A to I are corrected with the amounts of correction.

In Steps S36 to S40 of the correction process according to the third embodiment, the same shading correction as that in the first embodiment, the second embodiment, or modifications corresponding to the first and second embodiments may be performed on the basis of the reference data corresponding to two image data items, four image data items, or nine image data items acquired from the two-viewpoint CCD 16, the four-viewpoint CCD 16, or the nine-viewpoint CCD 16.

When the planar image recording mode is set, after shading correction, two image data items, four image data items, or nine image data items may be composed to create a high-resolution planar image and the planar image may be compressed and recorded as a full-pixel planar image on the memory card 54. Alternatively, when the stereoscopic image recording mode is set, two image data items, four image data items, or nine image data items may be separately compressed and recorded as a stereoscopic image on the memory card 54.

In the stereoscopic image recording mode, any method is used to generate a 3D image corresponding to four image data items or nine image data items obtained from the four-viewpoint CCD 16 or the nine-viewpoint CCD 16. In the case of four viewpoints, a composite image L of the plane A and the plane C and a composite image R of the plane C and the plane D are formed to create a parallax image having parallax in the lateral direction. Alternatively, a composite image U of the plane A and the plane B and a composite image D of the plane C and the plane D are formed to create a parallax image having parallax in the longitudinal direction.

In the case of nine viewpoints, a composite image L of the planes A, D, and G and a composite image R of the planes C, F, and I are formed to create a parallax image having parallax in the lateral direction. Alternatively, a composite image U of the planes A, B, and C and a composite image D of the planes G, H, and I are formed to create a parallax image having parallax in the longitudinal direction.

If further generalized, the present invention can be applied to n×n-viewpoint (n=1, 2, 3, 4, . . . ) image data which has parallax in the longitudinal or lateral direction due to pupil division.

What is claimed is:

1. A stereoscopic imaging device that outputs a plurality of images with a phase difference caused by pupil division for a beam emitted from a single imaging optical system and is capable of restoring a stereoscopic image with a parallax corresponding to the phase difference from the plurality of images, comprising:

a composition device that composes the plurality of images and outputs reference data for shading correction on the basis of the composite image of the plurality of images; and a correction device that compares the reference data output from the composition device with each of the plurality of images and calculates a difference between an average density value of the reference data and an average density value of each of the plurality of images to determine the amount of shading correction for each of the plurality of images and corrects the shading of each of the plurality of images on the basis of the determined amount of shading correction;

an acquisition device that acquires set information when each of the plurality of images is captured; and a determination device that determines whether the shading correction by the correction device is needed on the basis of the set information acquired by the acquisition device, wherein the correction device corrects the shading of each of the plurality of images when the determination device determines that the shading correction by the correction device is needed, wherein the set information includes imaging mode setting information indicating a stereoscopic image capture mode or a planar image capture mode, and when the imaging mode setting information indicates the planar image capture mode, the determination device determines that the shading correction by the correction device is needed, wherein, when the imaging mode setting information indicates the stereoscopic image capture mode, the determination device determines that the shading correction by the correction device is not needed.

2. The stereoscopic imaging device according to claim 1, further comprising:

a thinning device that thins out pixels of each of the plurality of images, wherein the composition device composes the plurality of images from which the pixels are thinned out by the thinning device and outputs the reference data for shading correction on the basis of the composite image of the plurality of images, and the correction device interpolates the reference data such that the size thereof is equal to the original size of each of the plurality of images, compares the interpolated reference data with each of the plurality of images to determine the amount of shading correction for each of the plurality of images, and corrects the shading of each of the plurality of images on the basis of the determined amount of shading correction.

3. The stereoscopic imaging device according to claim 2, further comprising:
a filtering device that filters the reference data and each of the plurality of images using a low-pass filter and outputs the filtered reference data and the filtered plurality of images,
wherein the correction device compares the reference data and each of the plurality of images output from the filtering device to determine the amount of shading correction for each of the plurality of images and corrects the shading of each of the plurality of images on the basis of the determined amount of shading correction.

4. The stereoscopic imaging device according to claim 1, further comprising:
a filtering device that filters the reference data and each of the plurality of images using a low-pass filter and outputs the filtered reference data and the filtered plurality of images,
wherein the correction device compares the reference data and each of the plurality of images output from the filtering device to determine the amount of shading correction for each of the plurality of images and corrects the shading of each of the plurality of images on the basis of the determined amount of shading correction.

5. The stereoscopic imaging device according to claim 1, wherein the set information includes aperture setting information, and
when the aperture setting information is closer to an aperture side than to a predetermined aperture value, the determination device determines that the shading correction by the correction device is needed.

6. The stereoscopic imaging device according to claim 5, wherein the set information includes zoom position setting information, and
when the aperture setting information is closer to an opening side than to the predetermined aperture value and the zoom position setting information is closer to a wide side than to a predetermined zoom position, the determination device determines that the shading correction by the correction device is needed.

7. The stereoscopic imaging device according to claim 6, further comprising:
a filtering device that filters the reference data and each of the plurality of images using a low-pass filter and outputs the filtered reference data and the filtered plurality of images,
wherein, when the aperture setting information is closer to the opening side than to the predetermined aperture value and the zoom position setting information is closer to a telephoto side than to the predetermined zoom position, the determination device determines that the shading correction by the correction device is needed, and
when the determination device determines that the shading correction by the correction device is needed, the correction device compares the reference data and each of the plurality of images output from the filtering device to determine the amount of shading correction for each of the plurality of images and corrects the shading of each of the plurality of images on the basis of the determined amount of shading correction.

8. A shading correction method which outputs a plurality of images with a phase difference caused by pupil division for a beam emitted from a single imaging optical system and is capable of restoring a stereoscopic image with a parallax corresponding to the phase difference from the plurality of images, comprising:
composing the plurality of images and outputting, by utilizing a composition device, reference data for shading correction on the basis of the composite image of the plurality of images; and
comparing the reference data output from the composition device with each of the plurality of images and calculating a difference between an average density value of the reference data and an average density value of each of the plurality of images to determine the amount of shading correction for each of the plurality of images and performing the shading correction on each of the plurality of images on the basis of the determined amount of shading correction;
acquiring set information when each of the plurality of images is captured; and
determining, by utilizing a determination device, whether the shading correction is needed on the basis of the set information,
wherein the shading correction step corrects the shading of each of the plurality of images when the determination device determines that the shading correction is needed,
wherein the set information includes imaging mode setting information indicating a stereoscopic image capture mode or a planar image capture mode, and
when the imaging mode setting information indicates the planar image capture mode, the determination device determines that the shading correction by the correction device is needed, and
wherein, when the imaging mode setting information indicates the stereoscopic image capture mode, the determination device determines that the shading correction by the correction device is not needed.

* * * * *